United States Patent
Von Seggern

(10) Patent No.: US 9,138,673 B2
(45) Date of Patent: Sep. 22, 2015

(54) COALESCER FILTER

(71) Applicant: Michael Von Seggern, Kearney, NE (US)

(72) Inventor: Michael Von Seggern, Kearney, NE (US)

(73) Assignee: Baldwin Filters, Inc., Kearney, NE (US)

(*) Notice: Subject to any disclaimer, the term of this patent is extended or adjusted under 35 U.S.C. 154(b) by 0 days.

(21) Appl. No.: 14/208,805

(22) Filed: Mar. 13, 2014

(65) Prior Publication Data

US 2014/0260133 A1    Sep. 18, 2014

Related U.S. Application Data

(60) Provisional application No. 61/783,054, filed on Mar. 14, 2013.

(51) Int. Cl.
*B01D 46/00* (2006.01)
*B01D 46/24* (2006.01)

(52) U.S. Cl.
CPC .......... *B01D 46/0031* (2013.01); *B01D 46/002* (2013.01); *B01D 46/2403* (2013.01)

(58) Field of Classification Search
CPC .... B01D 46/00; B01D 46/10; B01D 46/0031; F02M 25/06
USPC ........ 55/385.3, 419, 482, 484, 502, 510, 521, 55/323, 330, 350.1, 413, 481; 123/198 E, 123/572, 573, 574, 41.86
See application file for complete search history.

(56) References Cited

U.S. PATENT DOCUMENTS

| | | | |
|---|---|---|---|
| 4,416,782 A | 11/1983 | Kerres | |
| 4,859,349 A | 8/1989 | Clark et al. | |
| 5,035,979 A | 7/1991 | Nguyen-Kim et al. | |
| 5,438,965 A | 8/1995 | Aronsson et al. | |
| 5,480,547 A | 1/1996 | Williamson et al. | |
| 6,247,463 B1 * | 6/2001 | Fedorowicz et al. | 123/572 |
| 6,354,283 B1 | 3/2002 | Hawkins et al. | |
| 6,422,396 B1 | 7/2002 | Li et al. | |
| 6,478,018 B2 | 11/2002 | Fedorowicz et al. | |
| 6,478,019 B2 | 11/2002 | Fedorowicz et al. | |
| 6,505,615 B2 * | 1/2003 | Pietschner | 123/572 |
| 6,599,350 B1 * | 7/2003 | Rockwell et al. | 96/135 |
| 6,626,163 B1 * | 9/2003 | Busen et al. | 123/572 |
| 6,684,864 B1 * | 2/2004 | Busen et al. | 123/572 |
| 6,858,051 B2 * | 2/2005 | Uhlenbrock | 55/321 |
| 7,186,282 B2 * | 3/2007 | Su | 55/330 |

(Continued)

FOREIGN PATENT DOCUMENTS

WO    WO 95/13856    5/1995

*Primary Examiner* — Duane Smith
*Assistant Examiner* — Minh-Chau Pham
(74) *Attorney, Agent, or Firm* — Reinhart Boerner Van Deuren P.C.

(57) ABSTRACT

A coalescing filter assembly including a coalescing filter element is provided. The coalescing filter assembly includes a base housing and a cover housing that together form a coalescing chamber. Disposed within the coalescing chamber is the coalescing filter element. The coalescing filter element includes a frame with a partition that separates an unfiltered side from a filtered side of the coalescing filter assembly. A port connects the unfiltered side to the filtered side through the partition. A coalescing tube including coalescing filter media is connected to the port. Unfiltered fluid that enters the coalescing filter assembly is passed through the coalescing filter media such that the contaminants are removed to create a filtered fluid. The filtered fluid exits the coalescing filter assembly at an outlet of the coalescing filter assembly.

27 Claims, 25 Drawing Sheets

(56) References Cited

U.S. PATENT DOCUMENTS

| | | |
|---|---|---|
| 7,238,216 B2 * | 7/2007 | Malgorn et al. ............... 55/418 |
| 7,582,130 B2 | 9/2009 | Ng et al. |
| 7,674,425 B2 | 3/2010 | Schwandt et al. |
| 7,828,869 B1 | 11/2010 | Parikh et al. |
| 7,959,714 B2 | 6/2011 | Smith et al. |
| 8,114,182 B2 | 2/2012 | Smith et al. |
| 8,114,183 B2 | 2/2012 | Schwandt et al. |
| 2004/0040272 A1 * | 3/2004 | Uhlenbrock ................. 55/423 |
| 2005/0082238 A1 | 4/2005 | Larson |
| 2006/0032486 A1 * | 2/2006 | Prasad ........................ 123/572 |
| 2006/0059875 A1 * | 3/2006 | Malgorn et al. ............... 55/468 |
| 2006/0062699 A1 * | 3/2006 | Evenstad et al. ............ 422/110 |
| 2007/0062887 A1 | 3/2007 | Schwandt et al. |
| 2007/0131235 A1 | 6/2007 | Janikowski et al. |
| 2007/0240392 A1 * | 10/2007 | Ng et al. ..................... 55/482 |
| 2009/0193972 A1 | 8/2009 | Schwandt et al. |
| 2011/0094382 A1 | 4/2011 | Rego et al. |
| 2011/0239600 A1 | 10/2011 | Smith et al. |
| 2011/0277301 A1 | 11/2011 | Ellis et al. |

* cited by examiner

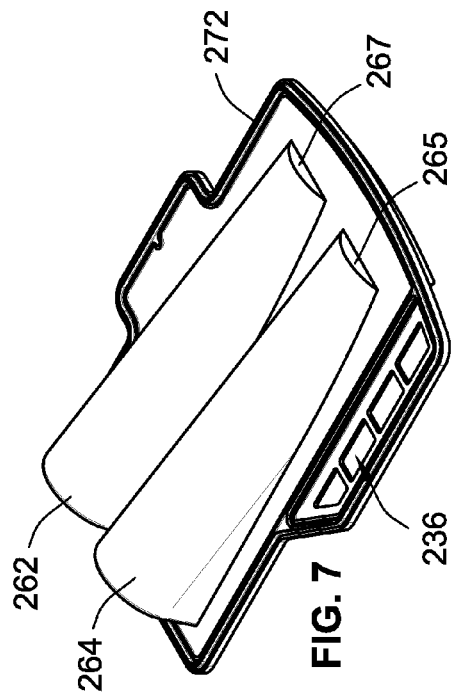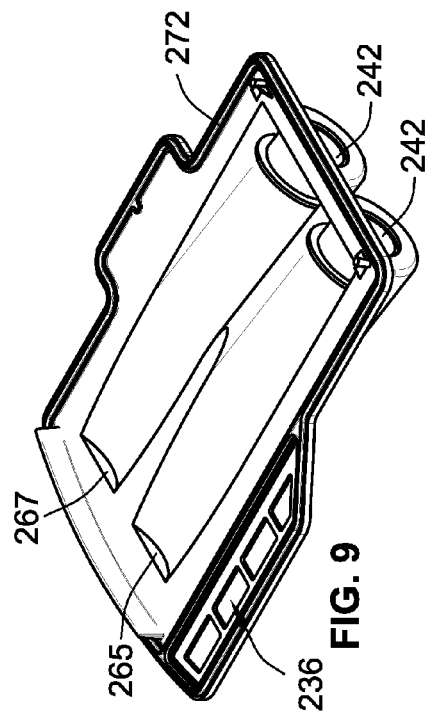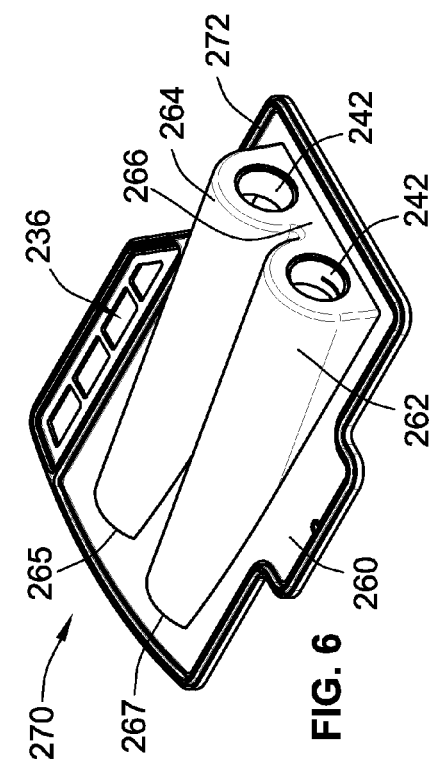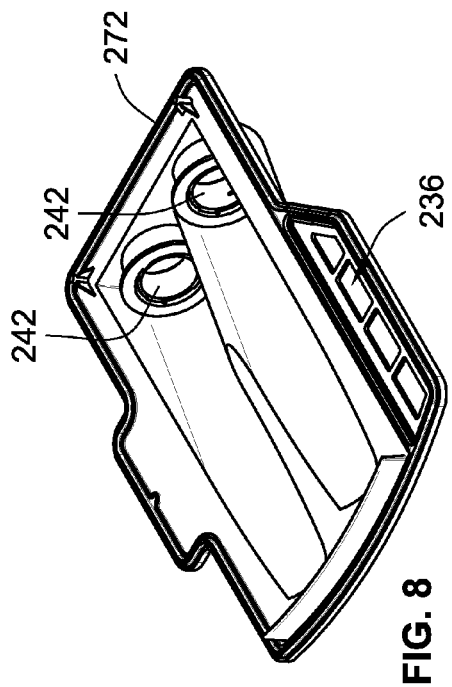

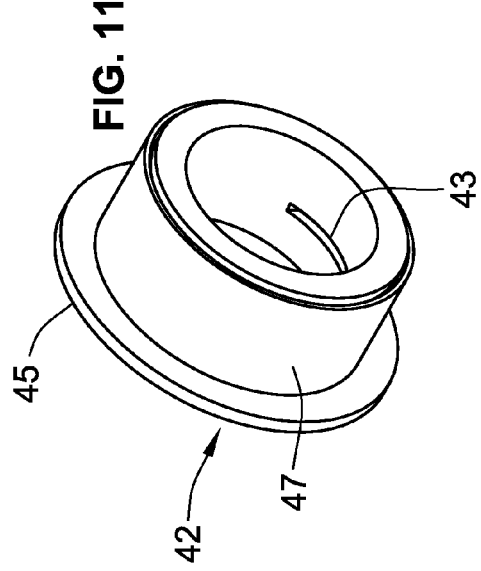
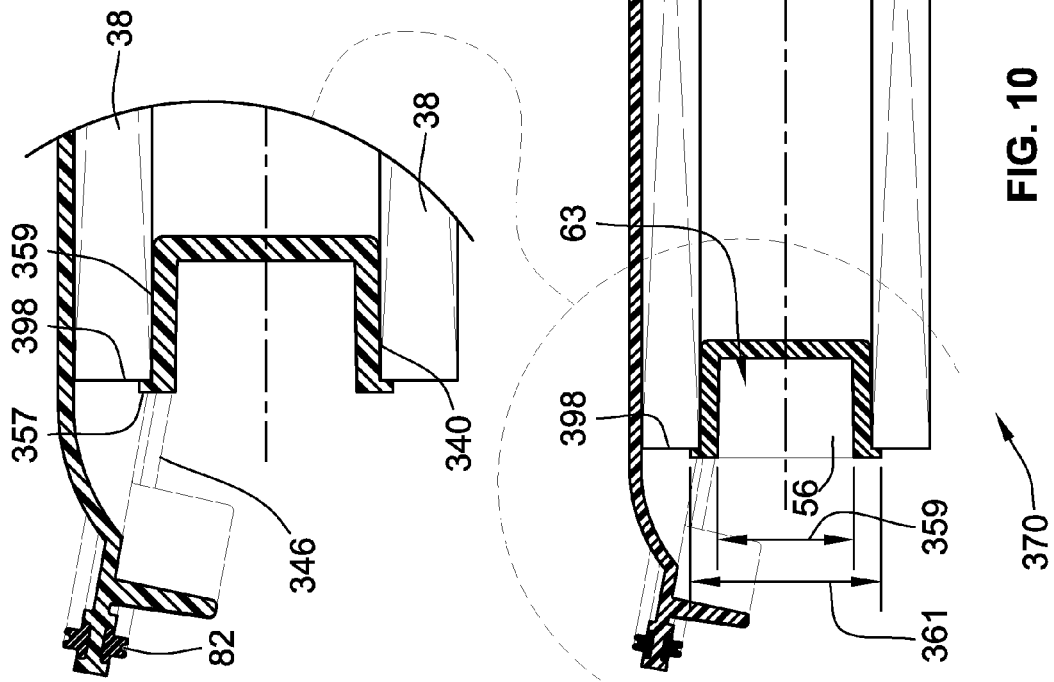

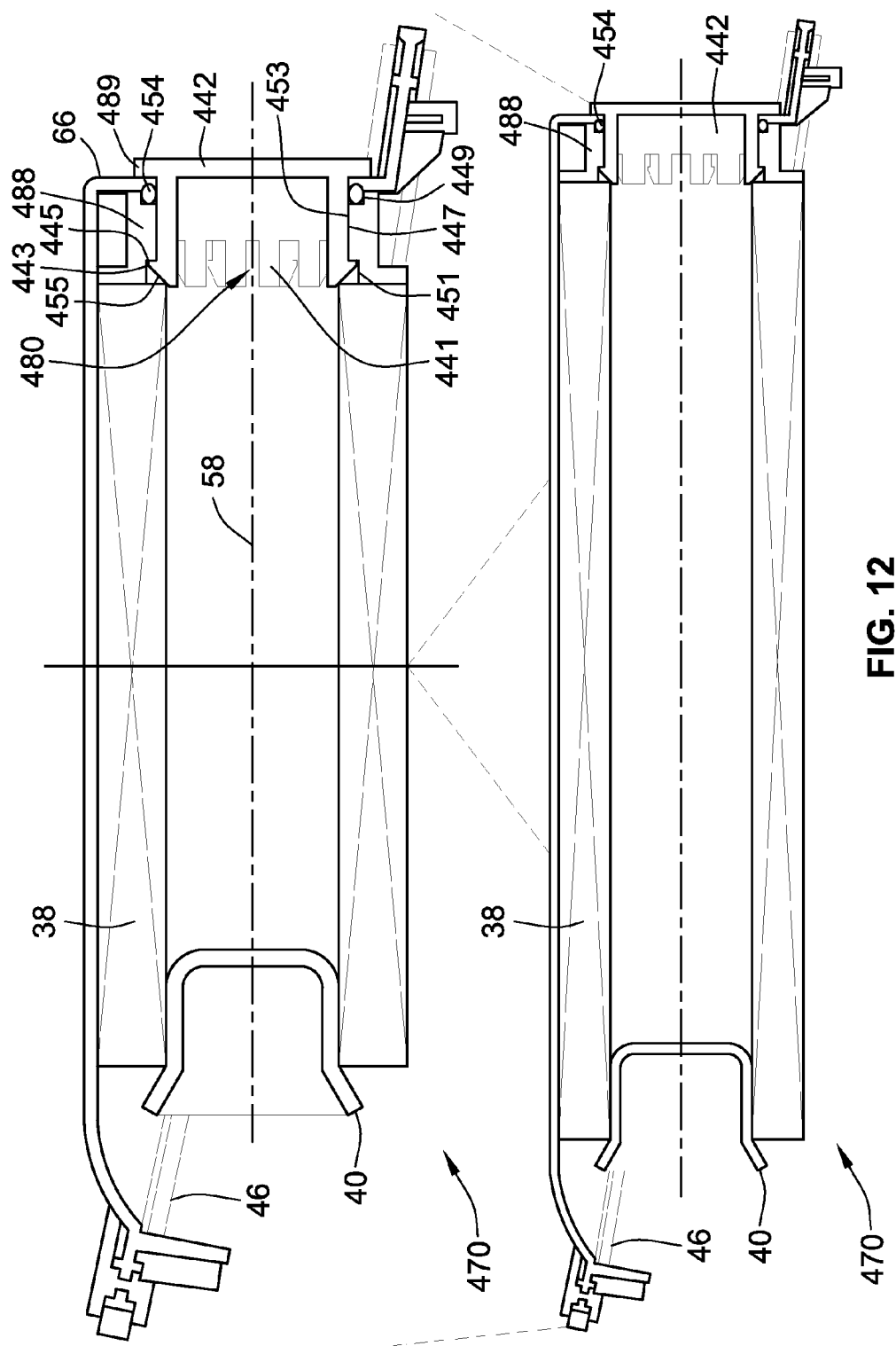

COALESCER FILTER

CROSS-REFERENCE TO RELATED PATENT APPLICATIONS

This patent application claims the benefit of U.S. Provisional Patent Application No. 61/783,054, filed Mar. 14, 2013, the entire teachings and disclosure of which are incorporated herein by reference thereto.

FIELD OF THE INVENTION

This invention generally relates to filters, including filters for a crankcase of an internal combustion engine, and more particularly relates to a coalescer filter assembly.

BACKGROUND OF THE INVENTION

Filters of the type used for filtering particulate matter from fluid sometimes include a filter housing having an inlet for receiving the fluid with entrained particulate matter, and an outlet for delivering the filtered fluid to a device needing fluid that is free of particulate matter. For example, a filter may be provided at the air inlet of an internal combustion engine. An example of such a filter is provided in U.S. Pat. No. 7,828,869 to Parikh et al.

In such filters, the particulate matter is typically removed by a filter element that is installed within the filter housing in such a manner that the fluid must flow through the filter element, including a filter pack of porous filter material, which removes the particulate matter from the fluid. One such filter element is a coalescer filter element that includes a coalescer filter pack. A coalescer filter pack operates by capturing the denser particulate matter of a contaminated fluid including at least two constituents, such as air and oil, fuel and water, or water and oil. In the case of air and oil, the coalescer filter pack captures the denser oil, coalesces the oil, and passes the less dense air. An example of such a coalescer filter pack is provided in U.S. Pat. No. 8,114,183 to Schwandt et al.

Over time, the coalescer filter pack of the coalescer filter element will become plugged or coated with particulate matter, necessitating removal and replacement of the filter element in order for the filter to continue in its function of supplying particulate-free fluid at the outlet of the housing. As such, a tradeoff made in designing a coalescer filter element is removal efficiency of the denser portion of the contaminated fluid and lifetime of the coalescer filter pack versus size of the coalescer filter pack.

It is desirable to provide an improved coalescer filter element having a coalescer filter pack that is more robust than the arrangements used in prior filters. It is also desirable to provide such an improved filter element and filter apparatus in a form that can be manufactured in a straight-forward and low cost manner.

The invention provides such a filter. These and other advantages of the invention, as well as additional inventive features, will be apparent from the description of the invention provided herein.

BRIEF SUMMARY OF THE INVENTION

In one aspect, the invention provides a coalescing filter assembly. The coalescing filter assembly includes a housing that includes a base housing member and a cover housing member joined together to form a coalescing chamber. The base housing member includes a base end panel and a base border wall projecting from the end panel. The cover housing member includes a cover end panel and a cover border wall projecting from the cover end panel. The cover end panel and base end panel are spaced apart laterally with the coalescing chamber therebetween. The cover border wall and the base border wall are joined along a seal interface to surround the coalescing chamber. The cover end panel and the base end panel extend at an angle relative to the seal interface of at least five degrees in the vertical direction. The coalescing filter assembly further includes a coalescing filter element including a frame having a partition that separates an unfiltered side from a filtered side. The partition has a coalescing inlet port connecting the unfiltered side and the filtered side and carrying a coalescing filter media arranged to filter fluid flowing through the coalescing inlet port. The partition includes a panel member. The panel member carries a seal member at an outer periphery thereof that seals along the seal interface whereby the partition is free of a diagonal tapering border skirt.

In another aspect, the invention provides a coalescing filter element. The coalescing filter element includes a frame that has a partition separating an unfiltered side from a filtered side. The partition has a coalescing inlet port connecting the unfiltered side and the filtered side. The coalescing filter element further includes at least one coalescing tube including coalescing filter media arranged to filter fluid flowing through the coalescing inlet port. The partition includes a panel member that carries a seal member at an outer periphery thereof. Further, a tapering channel is formed and recessed into the panel member, and the tapering channel is joined to an end wall that projects outward from the panel member. The coalescing inlet port is formed through the end wall, and the at least one coalescing tube is in fluid communication with the coalescing inlet port through the end wall with the tapering channel receiving the coalescing tube.

In yet another aspect, the invention provides a coalescing filter assembly. The coalescing filter assembly includes a housing including a base housing member and a cover housing member joined together to form a coalescing chamber. The base housing member includes a base end panel and a base border wall projecting from the base end panel. The cover housing member includes a cover end panel and a cover border wall projecting from the cover end panel. The cover end panel and base end panel are spaced apart laterally with the coalescing chamber therebetween. The cover border wall and the base border wall are joined along a seal interface. The base housing member comprises an inlet and an outlet with a fluid flow path running from the inlet to the outlet through the coalescing media of the coalescing filter element. The base housing member further includes a drain arranged at a gravitational bottom of the housing. A coalescing filter element is mounted in the coalescing chamber. The coalescing filter element includes a frame that has a partition separating an unfiltered side from a filtered side. A coalescing inlet port is formed through the partition. The coalescing filter element also includes a coalescing tube including coalescing filter media and a central cavity that extends between opposed end faces. A central flow axis extends into the coalescing tube through the coalescing inlet port and the central cavity with the coalescing filter media surrounding the central flow axis. The central flow axis extends substantially vertical with no more than thirty degrees variance from vertical such that one of the opposed end faces is adjacent the drain. The coalescing filter element also includes a seal member sealing the frame in surrounding relation of the partition to the housing of the coalescing filter assembly. The seal seals along the seal interface.

Yet another aspect of the present invention is directed toward a coalescing filter element comprising a frame having a partition separating an unfiltered side from a filtered side. The partition has a coalescing inlet connecting the unfiltered side and the filtered side and that carries a tubular coalescing filter media arranged to filter fluid flowing through the coalescing inlet port. The frame can include a panel member. Further, the tubular coalescing media can comprise oppose end faces with a tubular ring extending therebetween. At least one of the opposed end faces is at least partially exposed to allow fluid flow through at least one of the opposed end faces.

In a more specific embodiment according to the above aspect, the coalescing filter element is end cap free with both of the opposed end faces of the tubular coalescing filter media being at least partially exposed.

In accordance with a feature for the above aspect, the filter element may include a plug projecting into an open end of the coalescing tube.

The plug may have a portion that partially covers a flat end face of the coalescing tube, but leaves a remainder exposed with a projecting portion extending axially into the coalescing tube.

For example, the plug may include a flared outer rim that transitions a diameter of the plug from a first diameter to a second diameter, where the second diameter is larger than the first diameter such that the flared outer rim of the plug is in contact with a hollow cylindrical cavity of the coalescing tube.

In an embodiment, a plurality of coalescing tube segments may provide for the coalescing tube with each coalescing tube segment separately secured to the frame. For example, the frame made include tubular receptacles projecting from the panel member with the tubular receptacles contacting an outer cylindrical surface of the coalescing tube segments and defining flare regions in which adhesive bonds the coalescing tube segments to the tubular receptacles. As a result, the opposed end face proximate the flared region may be exposed to allow fluid flow therethrough.

Further, the coalescing tube segments may define a tube segment filter axis, which is disposed at an angle between 95 degrees and 120 degrees to a plane of the panel member.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 6-9 are various views of a frame for a coalescing filter element in accordance with certain aspects of the invention;

FIG. 10 is a cross section of a coalescer filter element in accordance with certain aspects of another embodiment;

FIG. 11 is a close-up illustration of a coalescing inlet port of the coalescer filter element of FIG. 10;

FIG. 12 is a cross section of a coalescer filter element in accordance with certain aspects of the invention;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
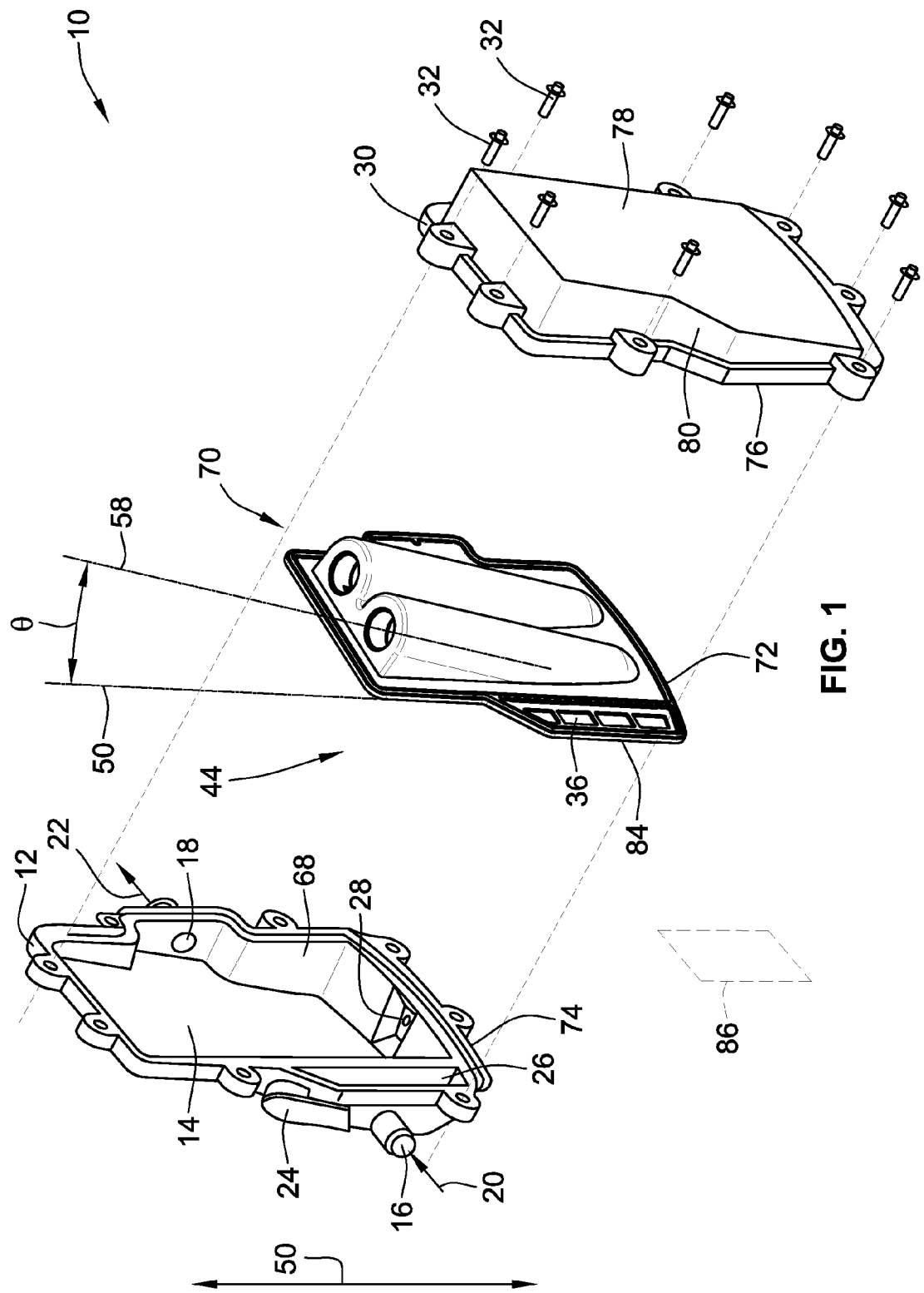
FIG. 1 is an exploded view of a coalescing filter assembly including a filter housing and a coalescer filter element in accordance with certain aspects of the invention.

FIG. 1 illustrates an exploded view of a coalescing filter assembly 10 arranged vertically along a filter axis 50. The coalescing filter assembly 10 includes a base housing member 12 and a cover housing member 30 with a coalescing filter element 70 disposed between the base 12 and the cover 30. The base member 12 includes a base end panel 14 and a base border wall 68 extending from the end panel 14. The base border wall 68 includes an outer perimeter or base seal interface 74 that is distal from the base end panel 14. The cover member 30 includes a cover end panel 78 with a cover border wall 80 extending from the cover end panel 78. The cover border wall 80 includes an outer perimeter or cover seal interface 76 that is distal from the cover end panel 78.

Figure 2:
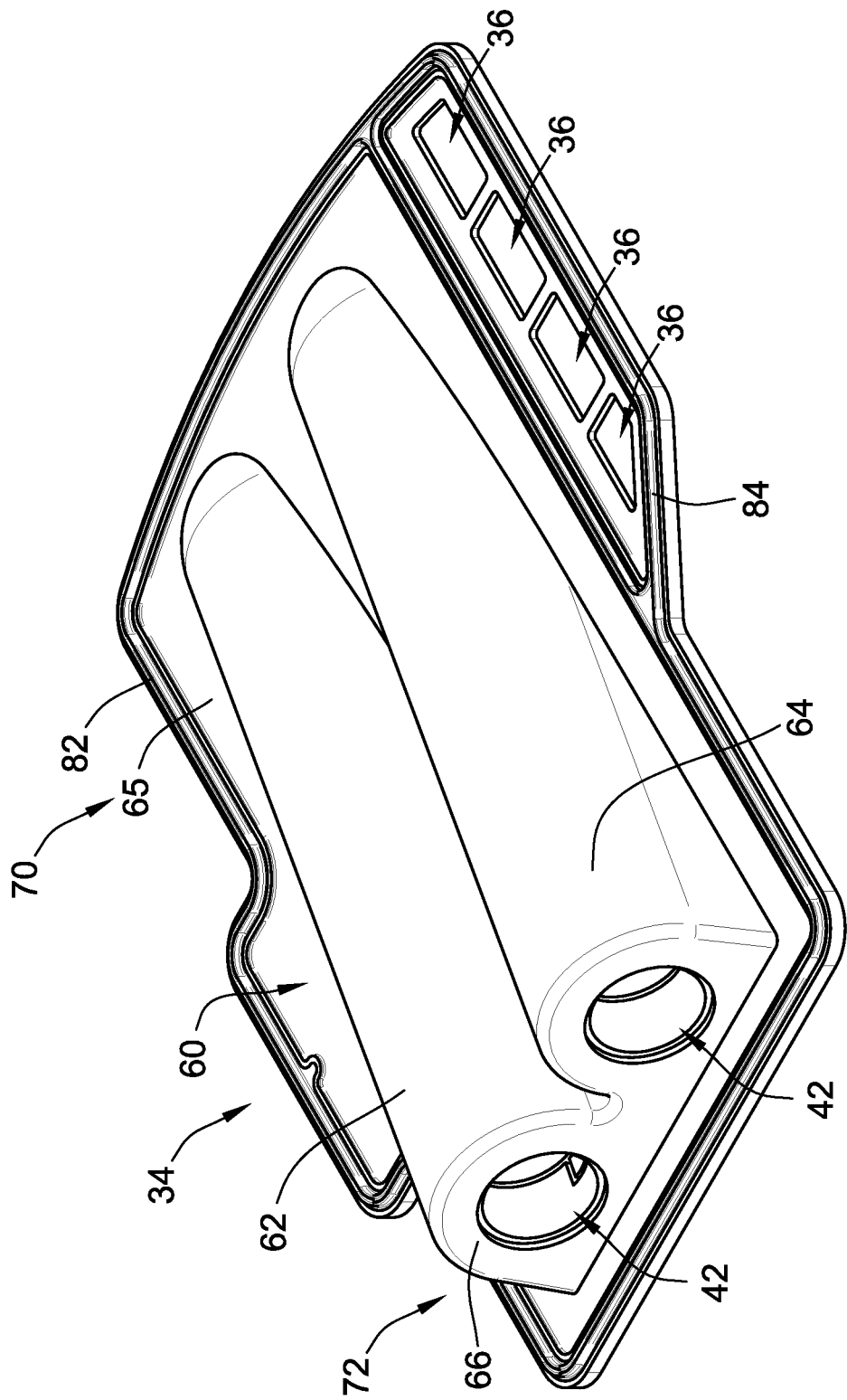
FIG. 2 is an isometric view of an unfiltered side of the coalescer filter element of FIG. 1.

FIGS. 1 and 2 illustrate the coalescing filter element 70, which includes a frame 72. The frame 72 includes a partition 60, which separates an unfiltered side 34 from a filtered side 44 of the coalescing filter assembly. The partition 60 also includes a panel member 65 and carries a sealing gasket 82 at an outer periphery thereof. As illustrated in FIG. 1, the periphery of the partition 60 and the sealing gasket 82 are the same shape as both of the base seal interface 74 and the cover seal interface 76. The base member 12 and the cover member 30 are joined together by attachment members 32, which in the embodiment illustrated in FIG. 1 are screws 32. As such, when the base member 12 and cover member 30 are joined they form a coalescing chamber with an airtight interface between the base seal interface 74, the sealing gasket 82, and the cover seal interface 76, and the coalescing filter element 70 is disposed therein.

As illustrated in FIG. 1, the base member 12 includes an unfiltered fluid input 16 and a filtered fluid output 18. Generally, the fluid to be filtered is in the form of an unfiltered gas 20 from a crankcase of an engine. The unfiltered gas 20 is entrained with oil, which if not filtered could potentially cause harm to the engine.

The unfiltered gas 20 enters the coalescing filter assembly through input 16 into an entry chamber 26. The entry chamber 26 interfaces with a side flange 84 of the frame 72 of the coalescing filter element 70. The side flange 84 includes windows 36 that allow the unfiltered gas 20 to enter the unfiltered side 34 of the coalescing filter assembly, which is disposed between the partition 60 and the cover end panel 78. From here, the unfiltered gas 20 enters the coalescing filter element 70 through a coalescing inlet port 42 formed through the partition 60. As such, the coalescing inlet port 42 connects the unfiltered side 34 to the filtered side 44 of the coalescing filter assembly 10. From here the unfiltered gas 20 enters coalescing filter media 38 (see FIG. 3) to become filtered gas 22 which exits the coalescing filter assembly 10 through outlet port 18.

Figure 3:
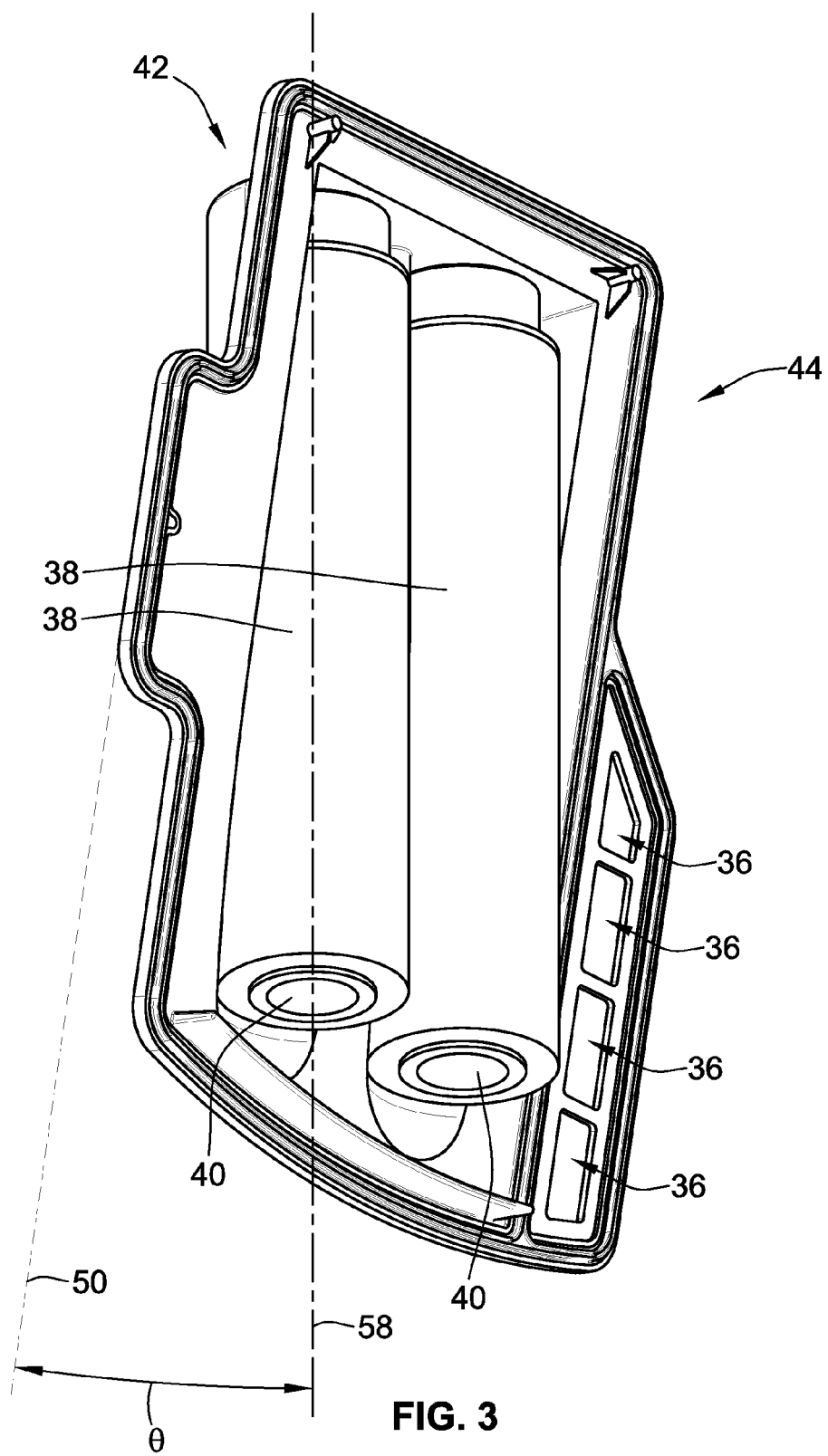
FIG. 3 is an isometric view of a filtered side of the coalescer filter element of FIG. 1.

FIGS. 1-3 illustrate two coalescing inlet ports 42, but more or less are contemplated. The coalescing inlet ports 42 connect to coalescing filter media in the form of coalescing filter media tubes 38, as illustrated in FIG. 3. The media tubes 38 are each disposed inside tapering channels 62, 64 recessed into the panel 65 of the frame 72, as illustrated in FIGS. 1 and 2. The tapering channel 62 begins at a channel end wall 66 and extends along the length of the coalescing filter element 70 along a central flow axis or in other words a filter media axis 58. Filter media axis 58 is offset from the filter axis 50 by an angle theta. Typically, angle theta is greater than or equal to five degrees and less than or equal to 30 degrees. The tapering channel 62 extends along the filter media axis such that it tapers down to become flush with the panel 65 at an end of the tapering channel 62 that is distal from the channel end wall 66, as illustrated in FIG. 2.

FIG. 1 illustrates a filter element plane 86 that is parallel to the partition 60 of the coalescing filter element 70 and the filter axis 50. In order to utilize filter media tubes 38 (see FIG. 3) that are linear and arranged generally vertical in use, the filter media tubes 38 are offset from the filter element plane 86 such that the unfiltered gas 20 can enter the filter media tube 38 on the unfiltered side 34 and exit to become filtered gas 22 on the filtered side 44. Therefore, on the unfiltered side 34, the cover end panel 78 is offset at the angle theta between the filter axis 50 and the filter media axis 58 such that the cover member 30 encloses the tapering channels 62, 64. Also, the base end panel 14 is offset from the filter axis 50 at an angle of negative theta such that the base member 12 encloses the filter media tubes 38 disposed on the filtered side 44 of the coalescing filter assembly 10.

FIG. 3 illustrates the filtered side 44 of the partition 60. Specifically, two filter media tubes 38 are shown. After the unfiltered gas 20 enters through the coalescing inlet ports 42, it passes into the filter media tubes 38 where oil is separated from the gas. The filtered gas 22 passes through the porous material that comprises the filter media tubes 38, while the oil coalesces in the filter media and drains under the force of gravity toward a plug 40 distal from the coalescing inlet port 42. The plug 40 is at a gravitational bottom of the coalescing filter assembly 10. As more and more oil gathers at the bottom of the filter media tubes 38 it may leak and pool at the bottom of the coalescing filter assembly 10 and drain through a drain outlet 28 at the bottom of the base housing member 12. (See FIG. 1).

Figure 4:
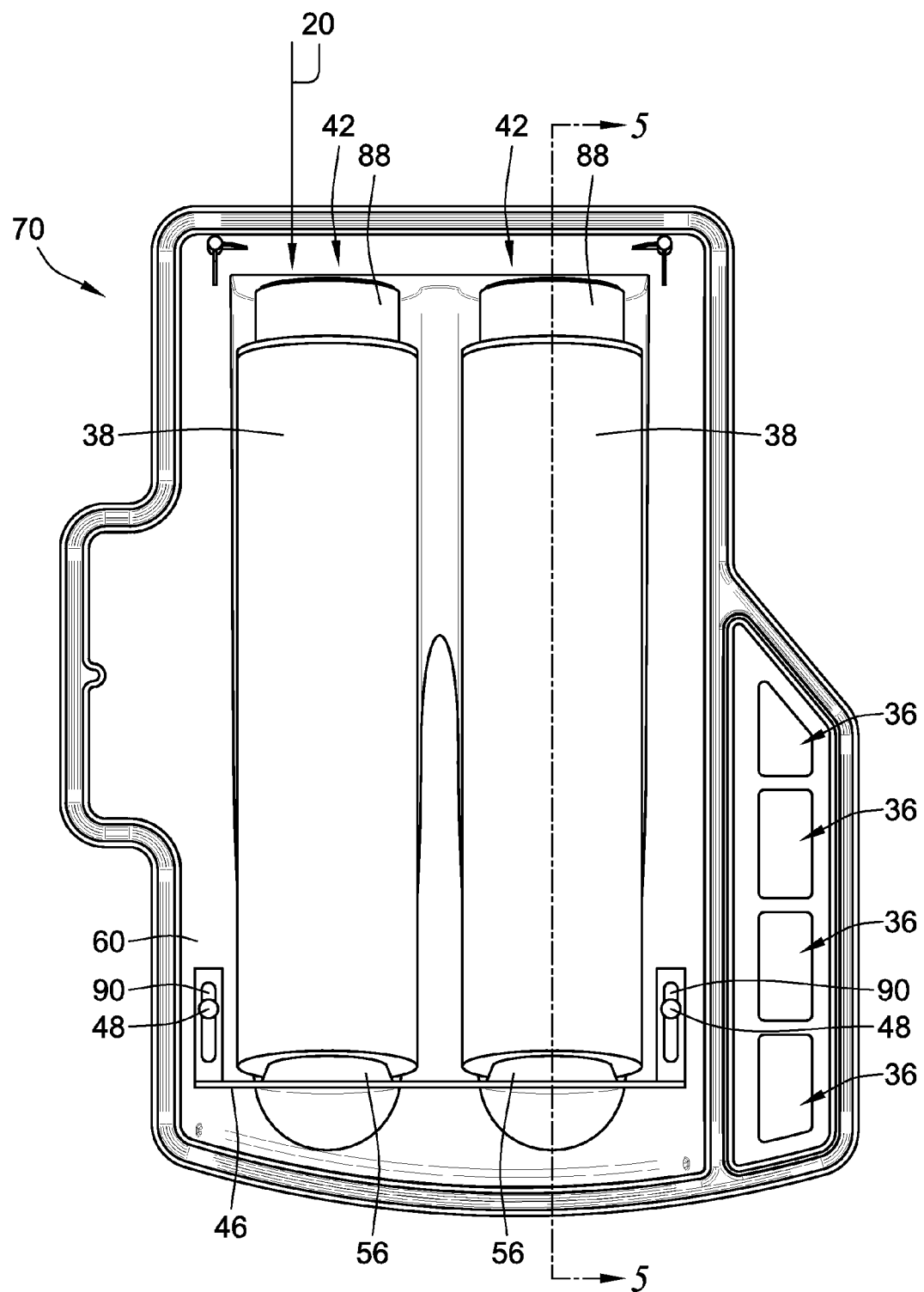
FIG. 4 is a frontal view of the filtered side of the coalescer filter element showing cylindrical media tubes of the coalescer filter element of FIG. 1 with the addition of support bracket.

FIG. 4 illustrates a front view of the filtered side 44 of the partition 60 of the coalescing filter element 70. In this view, the entire length of the coalescing filter media tubes 38 is shown. An open ended end member 88 is disposed at the end of the media tubes 38 located at the coalescing inlet port 42. The end member 88 interfaces with the channel end wall 66 (see FIG. 2) and is heat staked to the filter media tube 38 in order to form a seal interface for the unfiltered gas 20 to enter the filter media tube 38.

Further, the embodiment of the invention illustrated in FIG. 4 illustrates a support bracket 46, which is adhered to the partition 60 by an attachment mechanism 48. The bracket 46 supports the filter media tubes 38 by putting an upward directed force on the plugs 40 (see FIG. 3 or 5 for plugs) with bracket protrusions 56 such that the end member 88 is brought into abutment with the channel end wall 66 (see FIG. 2) to form an air tight interface.

Additionally, in the embodiment of the invention illustrated in FIG. 4, the attachment mechanism 48 is in the form of a screw 48 and slot 90. Based on the location of the screw 48 in the slot 90, the force that the bracket 46 places on the plug 40, in order to form the air tight interface between the channel end wall 66 (see FIG. 2) and the end member 88, may be slideably adjusted.

Figure 5:
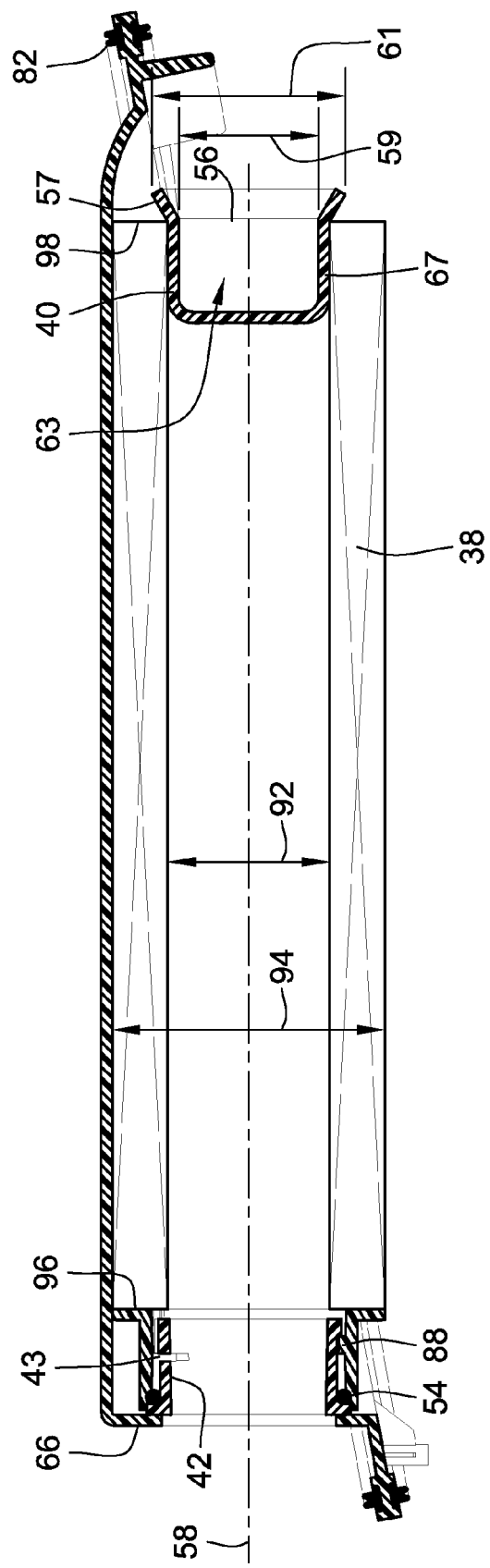
FIG. 5 is a cross section of the coalescer filter element of FIG. 1.

FIG. 5 illustrates a cross section through one of the filter media tubes 38 illustrated in FIGS. 1-4. From this view, it can be seen that the air tight interface between the end member 88 and the channel end wall 66 is aided by an o-ring 54 disposed between the end member 88 and the coalescing inlet port 42. Specifically, the end member 88 has a portion of the inner radius toward the entrance of the coalescing inlet port 42 removed such that the o-ring 54 can be inserted to form an air tight seal between the coalescing inlet port 42 and the end member 88. As such, all of the unfiltered gas 20 (see FIG. 1) enters the coalescing filter media 38.

Further, the coalescing inlet port 42 includes a snap lock channel 43. The snap lock channel 43 interacts with the end member 88 such that axial displacement between the coalescing inlet port 42 and the end member 88 is prevented.

The coalescing filter media tube 38, as illustrated in FIG. 5, is in the form of a hollow cylinder with an inner and an outer radius 92, 94 concentric with the filter media axis 58. Further, the coalescing filter media tube 38 includes first and second end faces 96, 98 oppositely disposed from each other. The first end face 96 is heat staked to the end member 88, and the second end face 98 is heat staked to the plug 40.

The plug 40 is arranged at a gravitational bottom of the filter media tube 38 such that it prevents unfiltered airflow therethrough and also that prevents filtered oil from draining out through the hole plugged at the second end face 98. Oil will drain gravitationally through the media and around the plug 40. Also, the plug 40 includes a flared outer rim 57 that transitions a first outer diameter 59 to a second outer diameter

61. The flared outer rim 57 of the plug 40 may form a seal with the inner diameter 92 of the coalescing filter media 38, and/or the axial projecting portion 67 of plug may seal or sufficiently contact against inner periphery of the coalescing tube. The seal prevents unfiltered air flow and may prevent filtered oil from draining from the hollow cylinder portion of the coalescing filter media tube 38. Oil however can drain around the plug 40. The plug 40 may also not seal or have ribs to allow for ready drainage of pooled oil.

Further, the plug 40 includes a cavity 63 such that a bracket protrusion 56 (e.g. see FIG. 4), extending from the bracket 46, can be inserted into the plug 40 in order to support the plug in the coalescing filter media tube 38. The protrusion 56 ensures a snug fit between the flared outer rim 57 of the plug 40 and the coalescing filter media tube 38. Adhesive such as glue may also secure the plug to the tube, and/or an interference fit.

FIGS. 6-9 illustrate a further embodiment of the coalescing filter assembly including a coalescing filter element 270. Coalescing filter element 270 includes a frame 272 also carrying a gasket that is substantially similar to frame 72 of the coalescing filter element 70 (see FIG. 2). For instance, coalescing filter element 270 includes a coalescing inlet port 242 and tapering channels 262, 264. The primary difference between coalescing filter element 70 and coalescing filter element 270 is the addition of a tapering channel wall 265, 267 for each tapering channel 262, 264. The tapering channel walls 265, 267 are oppositely disposed along the tapering channels 262, 264 from the channel entrance wall 266. The tapering channel walls 265, 267 are specifically illustrated in FIGS. 7 and 9.

The addition of the tapering channel walls 265 and 267 allow the coalescing filter media tube 38 (see FIG. 3) to reside deeper in the coalescing filter element 270. This reduces the volumetric space of the unfiltered side 34 (see FIG. 1) of the coalescing filter assembly 10, while increasing the volumetric space of the filtered side 44 of the coalescing filter assembly 10. This differential change in volume from one side of the coalescing filter assembly 10 to the other increases the force at which unfiltered gas 20 is introduced into coalescing filter media tubes 38. By increasing the force at which the unfiltered gas 20 is introduced greater filtration efficiency is achieved.

FIGS. 10 and 11 illustrate an additional embodiment of the coalescing filter element 370 including a plug 340. FIG. 10 specifically illustrates an up-close view of the plug 340. Plug 340 is different from the plug 40 of previously discussed embodiments. Specifically, plug 340 replaces the flared outer rim 57 (see FIG. 5) with a circumferential flange portion 357 that transitions from an inner plug diameter portion 359 to an outer plug diameter portion 361. The inner plug diameter portion 359 is sized such that it fits within the hollow center of the coalescing filter media tube 38. The outer plug diameter portion 361 abuts the second end face 398.

FIG. 11 illustrates an up close view of the coalescing inlet port 42 that can be secured to the frame. Coalescing inlet port 42 includes a sidewall 47 and a circumferential flange 45. The sidewall 47 and the flange 45 interact with the o-ring 54 similar to as described in relation to FIG. 5. Also, a snap lock channel 43 is formed in the sidewall 47 of the coalescing inlet port 42. As previously described, the snap lock channel 43 interacts with the end member 88 to prevent axial movement between the coalescing inlet port 42 and the end member 88.

FIG. 12 illustrates a further embodiment of the invention including a coalescing filter element 470. The primary difference between the coalescing filter element 70 and the coalescing filter element 470 is a modified end member 488, which accommodates a modified coalescing inlet port 442.

End member 488 includes a first and second increased inner diameter cut out portions 449, 451 along the inner surface of the end member 488. The first cut out portion 449 accommodates an o-ring 454, which operates to create an air tight interface between the end member 488 and the coalescing inlet port 442. The second cut out portion 451 creates a first stepped mating surface 445 in the end member 488, which interacts with a second stepped mating surface 443 of the coalescing inlet port 442.

The second stepped mating surface 443 of the coalescing inlet port 442 extends from each of a plurality of flexible fingers 441 that extend axially from the coalescing inlet port 442 disposed along the filter media axis 58. As the coalescing inlet port 442 is installed in the coalescing filter element 470, a sloped surface 455 of each of the flexible fingers 441 interacts with an inner surface 453 of the end member 488 that has a reduced diameter and is disposed between the first and second cut out portions 449, 451. As the sloped surface 455 slides past the inner surface 453 of the end member 488, the second stepped mating surface 443 will snap into a mating position with the first stepped mating surface 445 of the end member 488. This locks the coalescing inlet port 442 into place with the end member 488, which is heat staked to the coalescing filter media tube 38.

Furthermore, an outer wall 453 of the coalescing inlet port 442 is disposed between the second stepped mating surface 443 and a circumferential flange 489 of the coalescing inlet port 442. The circumferential flange 489 abuts the channel end wall 66 (see FIG. 2) when the coalescing inlet port 442 is installed. Further, the outer wall 453 is sized such that once the coalescing inlet port 442 is installed motion of the coalescing inlet port 442 is limited in the axial direction along the filter media axis 58 by the interaction between the first and the second stepped mating surfaces 443, 445 and the circumferential flange 489 and the channel end wall 66.

Figure 13:
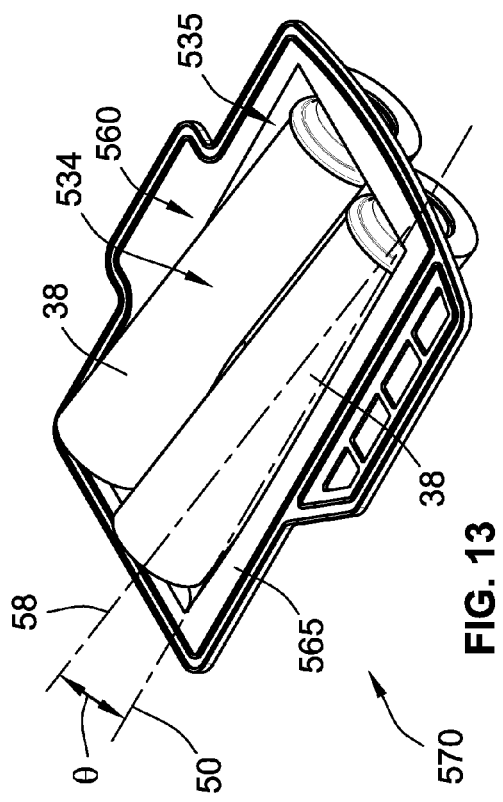
FIGS. 13-15 are various views of a coalescing filter element in accordance with another embodiment of the invention.
Figure 15:
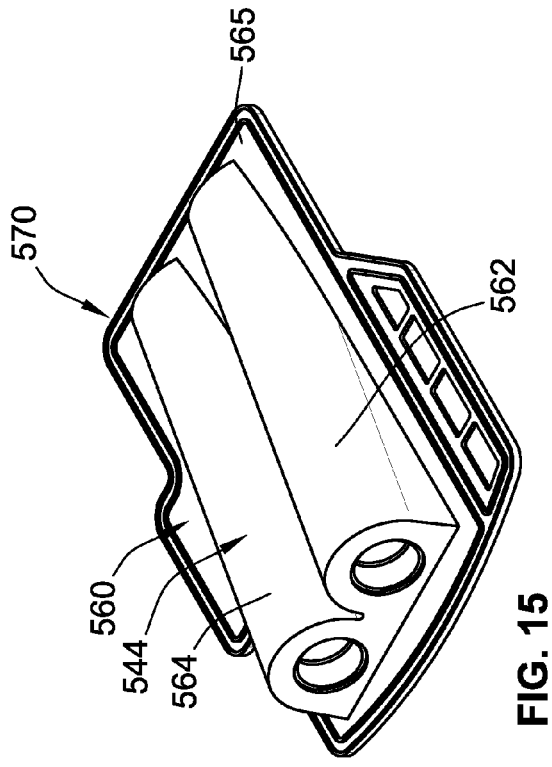
Figure 14:
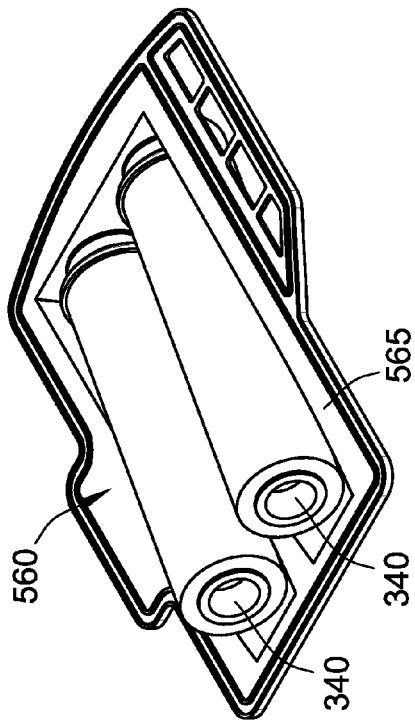

FIGS. 13-15 illustrate various views of a coalescing filter element 570 that reverses the flow of the unfiltered gas 20 through the coalescing filter media 38; wherein the flow enters the outer cylindrical face of the filter media 38 first, and then passes through the tube to the hollow core. Specifically, the coalescing filter element 570 includes a partition 560 that separates an unfiltered side 534 from a filtered side 544 of the coalescing filter element 570. The partition 560 includes a panel member 565 that has formed therein first and second tapering channels 562, 564. Tapering channels 562, 564 are recessed into the panel member 565 such that they extend into the filtered side of the partition 560.

Furthermore, the coalescing filter media 38 are disposed within the tapering channels 562, 564 (see FIG. 15). The tapering channels 562, 564 are arranged such that the coalescing filter media 38 are arranged axially along filter media axis 58. Similar to previously discussed embodiments of the invention, filter media axis 58 is offset from a filter axis 50 by an angle theta, which generally ranges between five degrees and thirty degrees.

Figure 16:
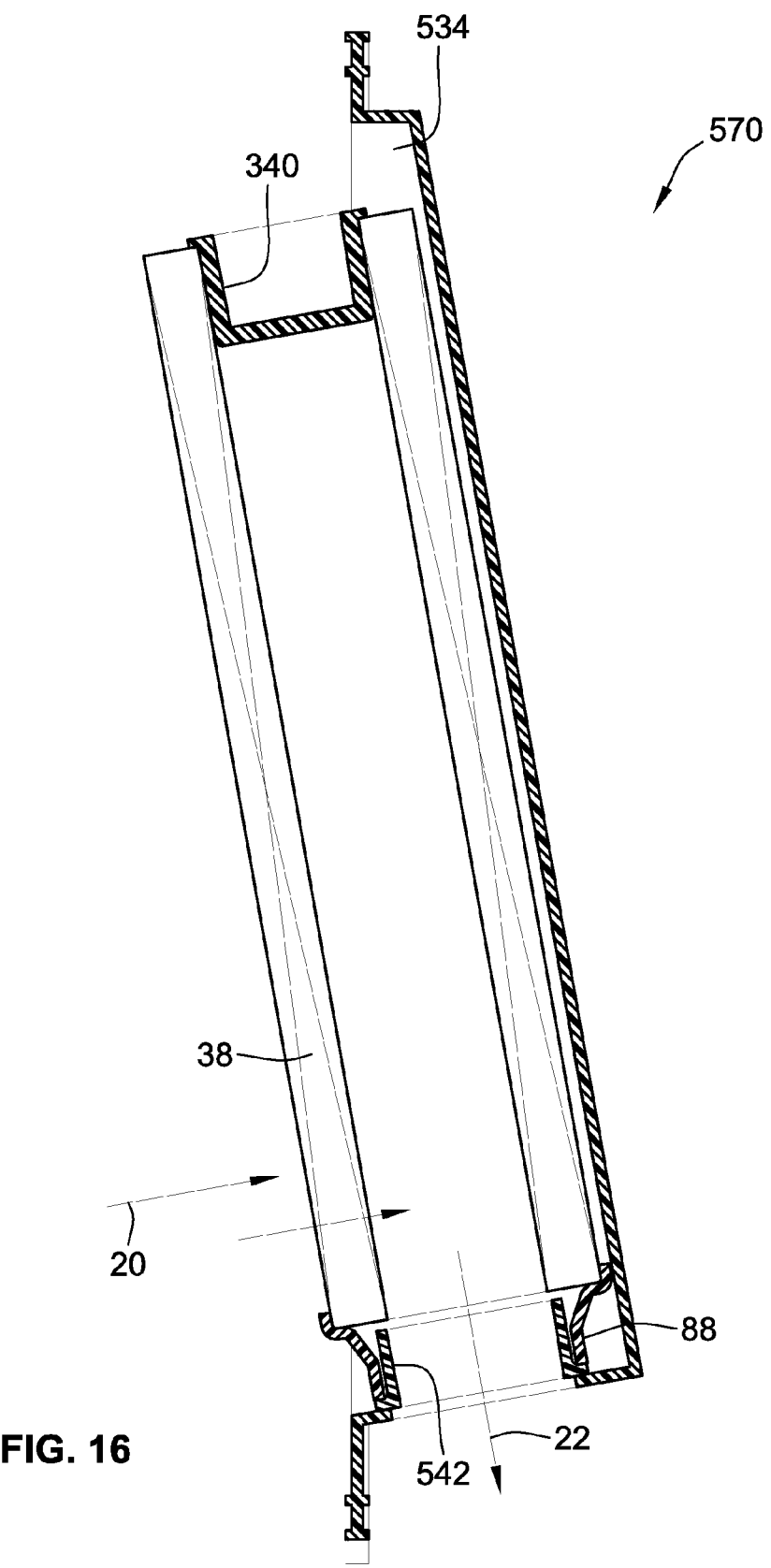
FIG. 16 is a cross-sectional view of the coalescing filter element of FIGS. 13-15.

FIG. 16 illustrates a cross-sectional view of the coalescing filter element 570. From this perspective, it can be seen that unfiltered gas 20 enters the coalescing filter media 38 through the media 38 itself that is exposed to the unfiltered gas 20, as opposed to other configurations discussed in relation to FIGS. 1-12. As such, the contaminants entrained in the unfiltered gas 20 coalesce upon entering the media 38, and filtered gas 22 is then passed out of the coalescing filter element 570 through what was the coalescing input port 42 (see FIG. 2) and now is an outlet port 542 for the filtered gas 22. The contaminants removed from the filtered gas 22 then drain under the force of gravity from the outlet port 542 such that the contaminants exit the coalescing filter assembly 10 through the drain outlet 28 at the bottom of the base housing member 12. (See FIG. 1).

FIG. 16 further includes a plug 340, which is physically the same as the plug 340 discussed in relation to FIG. 10. However, in the coalescing filter element 570, the plug 340 acts to prevent filtered gas 22 from escaping back into the unfiltered side 534. Therefore, the plug 340 works to create an aerosol can effect with the tubular coalescing filter media 38 in that the plug 340 works to build up pressure in the tubular coalescing filter media 38 in order to force the filtered gas out of the outlet port 542.

Additionally, FIG. 16 includes an end member 88 that is heat staked to the media 38. The end member 88 forms a seal between the outlet port 542 and the media 38.

Figure 17:
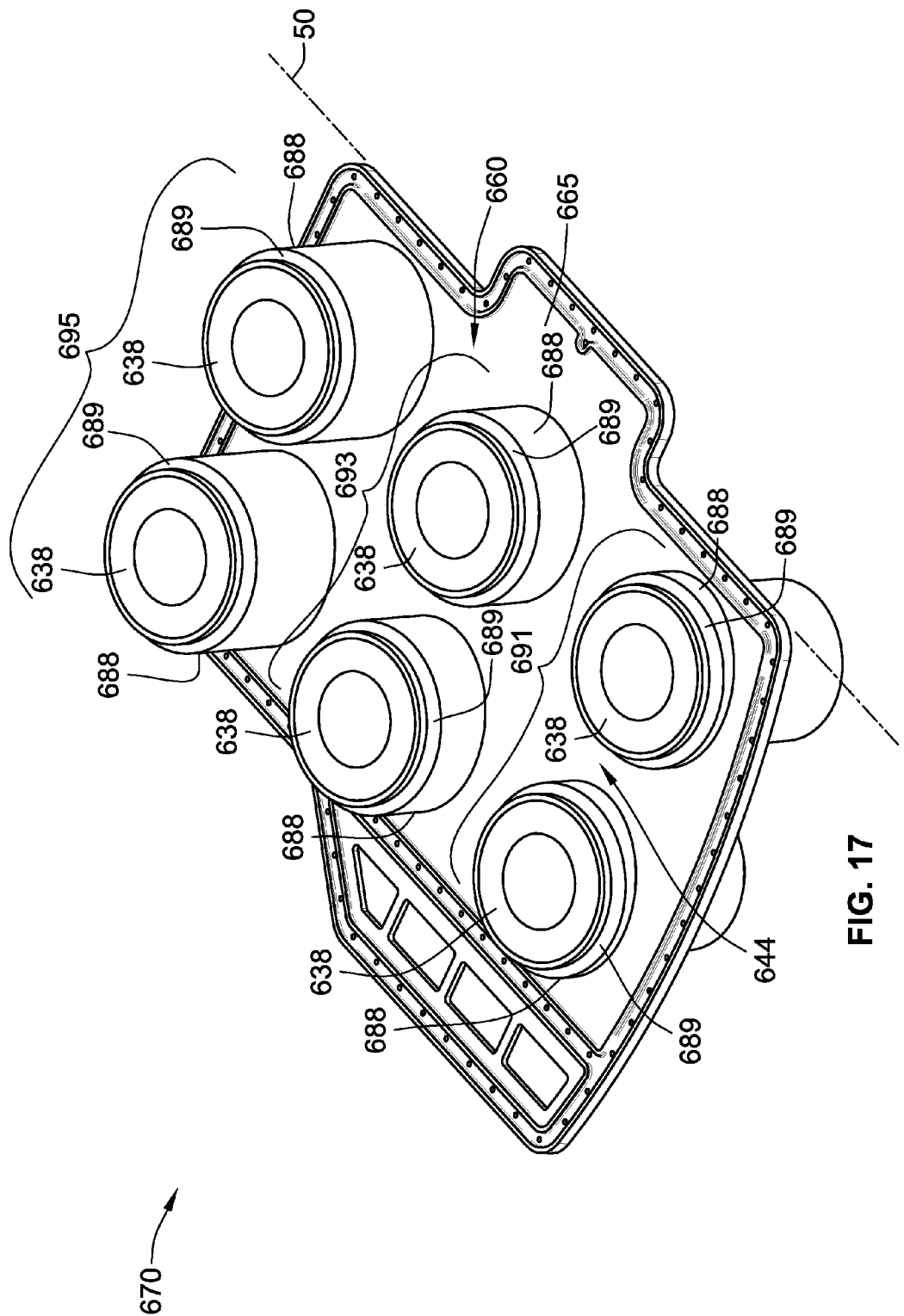
FIG. 17 is an isometric view of an unfiltered side of a coalescing filter element in accordance with another embodiment of the invention.
Figure 18:
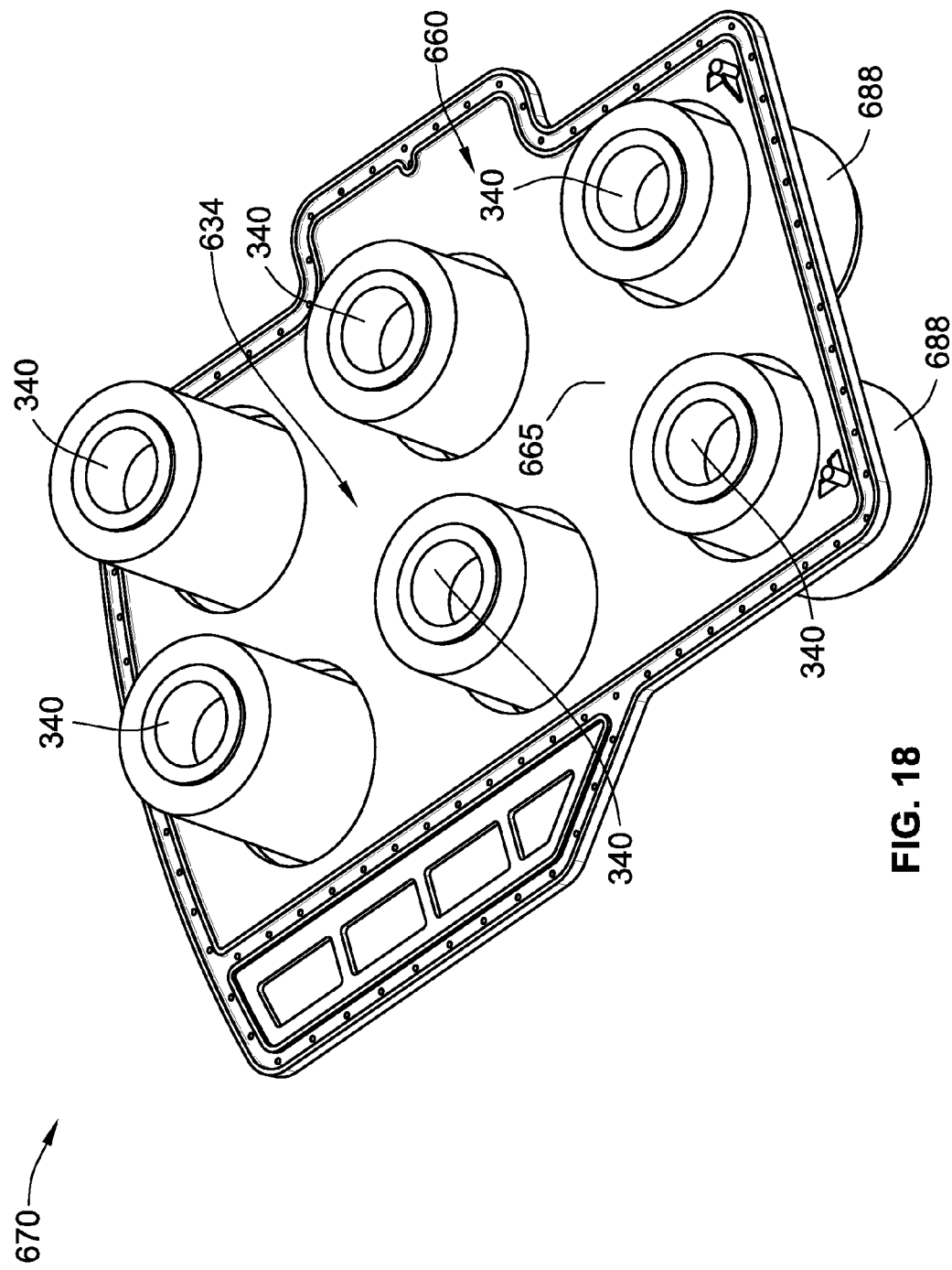
FIG. 18 is an isometric view of a filtered side of the coalescing filter element of FIG. 17.

FIGS. 17 and 18 illustrate an unfiltered side 644 and a filtered side 634, respectively, of a coalescing filter element 670, which can be installed in the housing being substituted for element 70 shown in FIG. 1. In the illustrated configurations of the coalescing filter element 670, tubular coalescing filter media 638 comprising more than two tube segments as per prior embodiments are disposed within tubular filter media receptacles 688 formed in the panel member of the frame. The receptacles 688 are arranged laterally along a partition 660 of the coalescing filter element 670, which separates the filtered side 634 from the unfiltered side 644. Specifically, the receptacles 688 are formed through a panel member 665 of the partition 660. Also, partition 660 defines a plane along the filter axis 50 through which coalescing inlet ports 697 (see FIG. 19) are formed, and the coalescing inlet ports 697 carry the coalescing filter media 638 and connect the unfiltered side 644 to the filtered side 634 of the coalescing filter element 670.

Furthermore, the receptacles 688 each include an axial end 689. Also, FIG. 17 illustrates six receptacles 688, which are arranged in groups of two receptacles 691, 693, and 695 spaced axially apart along the filter axis 50. The length of each receptacle 688 within each group of two receptacles 691, 693, and 695 are each respectively the same, while the length of each receptacle 688 between group 691, 693, and 695 vary. The variance in length is such that axial ends 689 of each receptacle 688 form points along a plane that are parallel to a tubular filter media receptacle axis 658 (see FIG. 19). Receptacle axis 658 is offset from the filter axis 50 by an angle theta, which is between five degrees and thirty degrees in magnitude.

Figure 19:
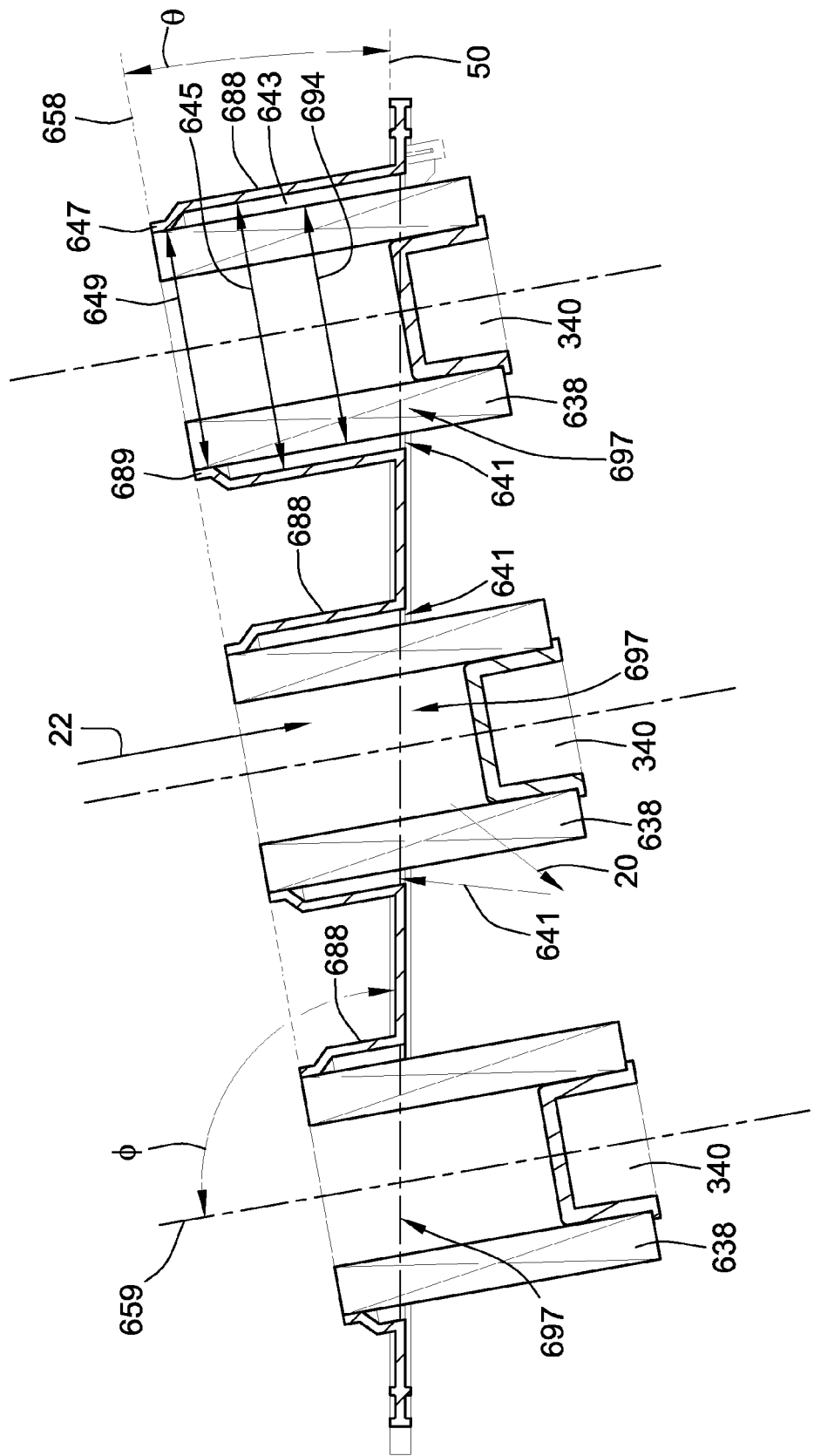
FIG. 19 is a cross-sectional view of the coalescing filter element of FIG. 17.

FIG. 19 illustrates a cross-sectional view of the coalescing filter element 670. From this perspective, a coalescing filter media axis 659 is shown that is perpendicular to the tubular filter media receptacle axis 658. Further, coalescing filter media axis 659 is separated from filter axis 50 by an angle phi, which is generally between 95 degrees and 120 degrees. As a result, the filter media axis 659 about which the tubular filter media segments surround is horizontal.

Furthermore, FIG. 19 illustrates adhesive wells 641 formed by each receptacle 688. The adhesive wells 641 are formed by an inner surface 643 of the receptacle 688. The profile of the inner surface 643 is such that it defines a first inner diameter 645 that is slightly larger than an outer media diameter 694. This creates an open space between the filter media 638 and the inner surface 643, which has an adhesive applied to this open space such that the filter media 638 is adhesively secured within the receptacle 688.

Further, to ensure that unfiltered gas 22 does not escape through the adhesive well and axial end 689 of the receptacle 688, a tapered portion 647 is included in the receptacle 688 such that the inner diameter 645 transitions to an inner diameter 649. The inner diameter 649 is the same length as the outer media diameter 694. Therefore, the inner surface 643 is flush with the filter media 638 at the axial end 689 of the receptacle 688.

FIG. 19 also illustrates the preferred fluid flow through the coalescing filter element 670. Similar to the embodiment of the coalescing filter element 570 illustrated in FIGS. 13-16, the coalescing filter media 638 is exposed to the unfiltered gas flow 22, which enters the coalescing filter element 670 through the coalescing filter media 638. Once the unfiltered gas 22 enters the coalescing filter media 638, the entrained contaminants coalesce in the media 638 such that filtered gas 20 is produced.

Additionally, the coalescing filter element 670 includes plugs 340, which are similar to the plug 340 discussed in relation to FIG. 11. Plugs 340 plug the open holes in each tubular filter media segment and block fluid from the media 638. Therefore, filtered gas 20 can only flow out of the media 638 through an outlet port formed between receptacle 688 and plug 340, which releases the filtered gas 20 into the filtered side 634 of the coalescing filter element 670.

Figure 20:
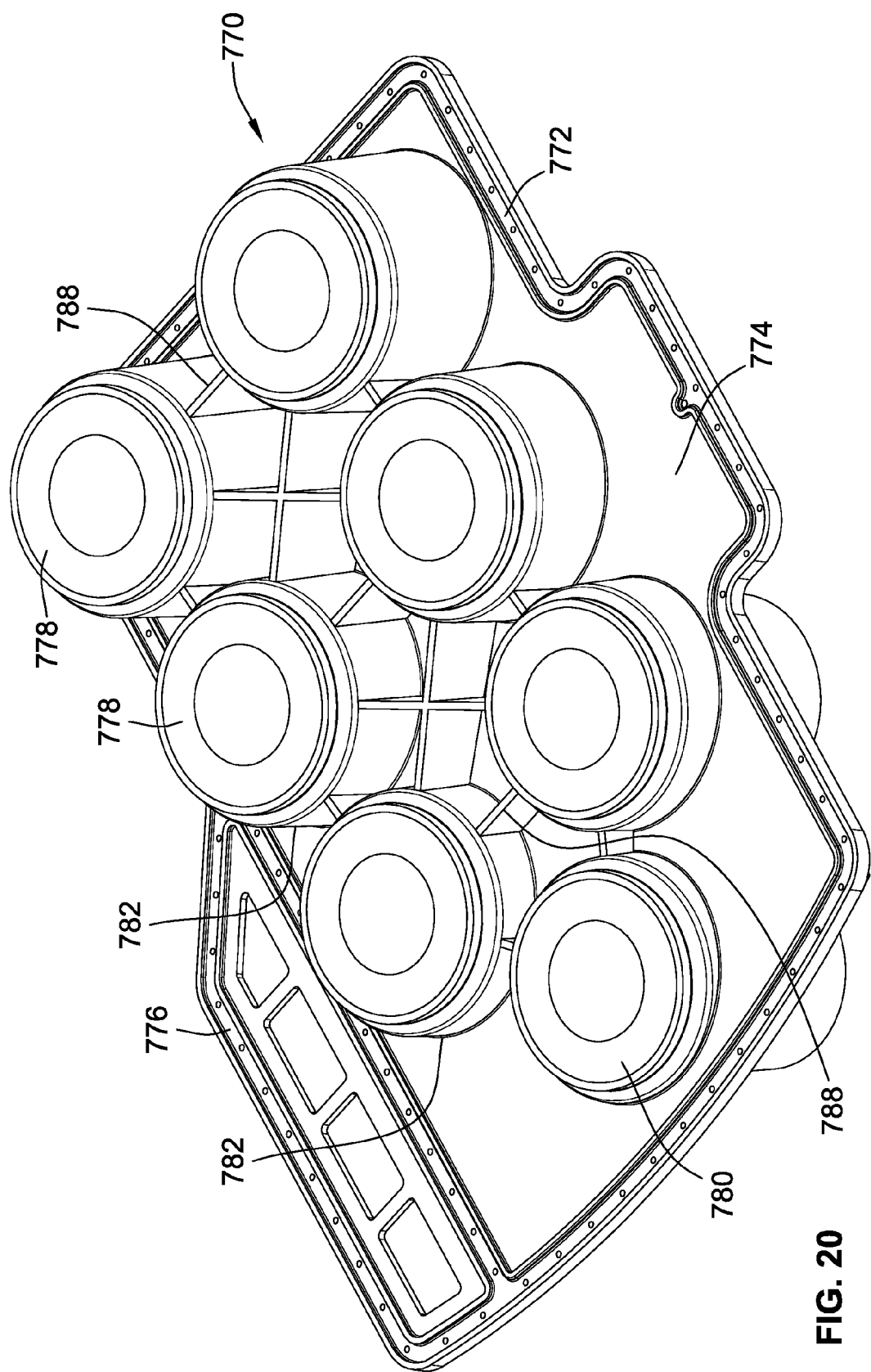
FIG. 20 is an isometric view of an unfiltered side of a coalescing filter element in accordance with another embodiment of the present invention.
Figure 21:
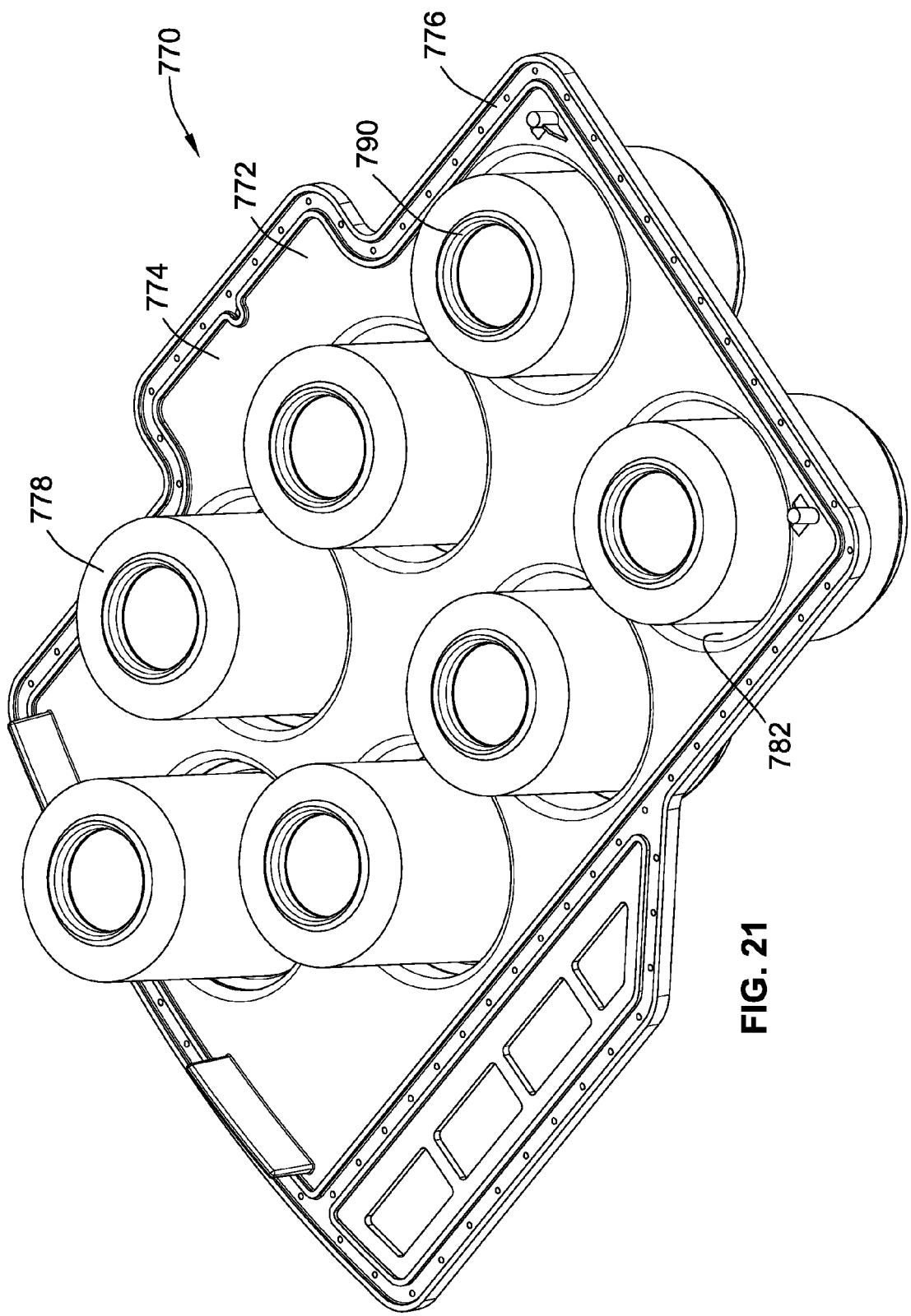
FIG. 21 is an isometric view of a filtered side of the coalescing filter element shown in FIG. 20.
Figure 22:
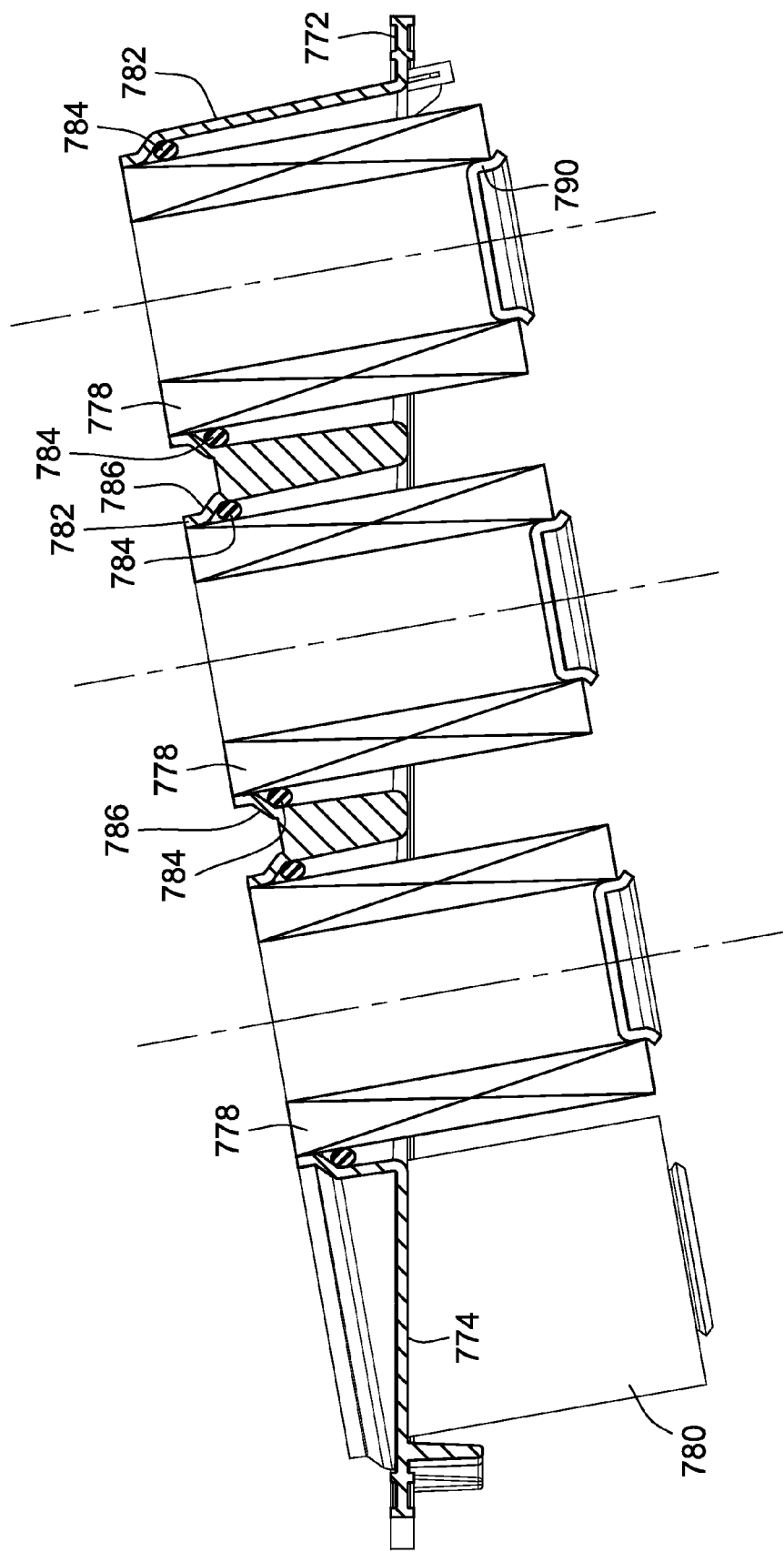
FIG. 22 is a cross section of the filter element shown in FIGS. 20 and 21.

Turning to yet another embodiment of the present invention, a coalescing filter element 770 as shown in FIGS. 20-22 is similar in all respects to coalescing filter element 670 shown in the prior embodiment and can also be installed between the housing shown in FIG. 1 as with the case for element 70, and therefore, only additional detail pertaining to features and distinctions will be focused upon. Like prior embodiments, coalescing filter element 770 includes a frame 772 including a panel member 774 that defines a periphery about which a sealing gasket may be mounted generally at parameter 776. In this embodiment, there are more tube segments 778 as compared with the prior embodiment which only had six. Specifically, this embodiment includes a central tube segment 780 disposed intermediate and at the gravitational bottom of two rows of other tube segments 778. This tube segment 780 when in use is disposed most closest and proximate gravitational drain 28 (as shown in FIG. 1). By being located centrally as opposed to lateral sides, this allows for any collected oil to more easily drain through the central tube segment 780 to reach the drain 28. Further, the central tube segment 780 may also have a more open or different filter media grade than the other tubes enabling greater flow. In other embodiments, the media grade is the same.

Like the prior embodiment of FIGS. 18-20, this embodiment may also comprise tube segments that are generally free of end caps at one or both sides. For example, no end caps are provided at either side. Instead, at one end, tubular receptacles 782 are formed and project from the panel member 774 in which tube segments 778 are received. Thus, this is just like the prior embodiment of FIGS. 17-19, which also showed tube segments retained in tube receptacles at outer perimeter. Also, similarly, individual tube segments 780 may be secured in a flared region 786 of each receptacle 782 by means of a circular ring of adhesive 784 that secures and may also seal the outer periphery of each tube segment 780 in the tubular receptacle 782 along an inner diameter thereof.

Additionally, this embodiment also shows that a rib network 788 comprising flange like structures 788 may interconnect adjacent tube receptacles 782 to provide additional structural support.

Also, similar to the previous embodiment, the other end of each tubular coalescing filter media and tubular segments may be plugged by a plug 790 that operates the same as plug 340 shown in prior embodiments. It will be pointed out that such plugs have a portion projecting into an open end of the coalescing tube. Further, each plug may additionally have a portion that partially covers the flat end face of the coalescing tube, but preferably, not the entire face so that a substantial portion of the end face of each coalescing tube segment may be exposed to allow for fluid flow therebetween both of air and/or oil that may be coalesced into liquid. The radial extension retainer portion may be flared as shown in this embodiment or flat as shown in other embodiments. Similarly, at the other inlet end, the entire flat end face of the tubular media may also be exposed to allow fluid flow at the inlet end through the end face as well. This maximizes the available surface area for fluid flow.

Furthermore, the contaminants removed from the filtered gas 20 drain under the force of gravity through the outlet port 642 such that the contaminants exit the coalescing filter assembly 10 through the drain outlet 28 at the bottom of the base housing member 12. (See FIG. 1).

FIGS. 23-28 illustrate a further embodiment of a coalescing filter 870. The coalescing filter 870 is similar in many respects to coalescing filter elements 670 and 770 discussed previously, and can similarly be installed in the housing of FIG. 1. Only additional detail pertaining to features and distinctions will be focused upon.

Like prior embodiments, coalescing filter element 870 includes a frame 772 including a panel member 874 that defines a periphery about which a sealing gasket may be mounted generally at perimeter 876. Like element 770, this embodiment includes seven tube segments.

Figure 23:
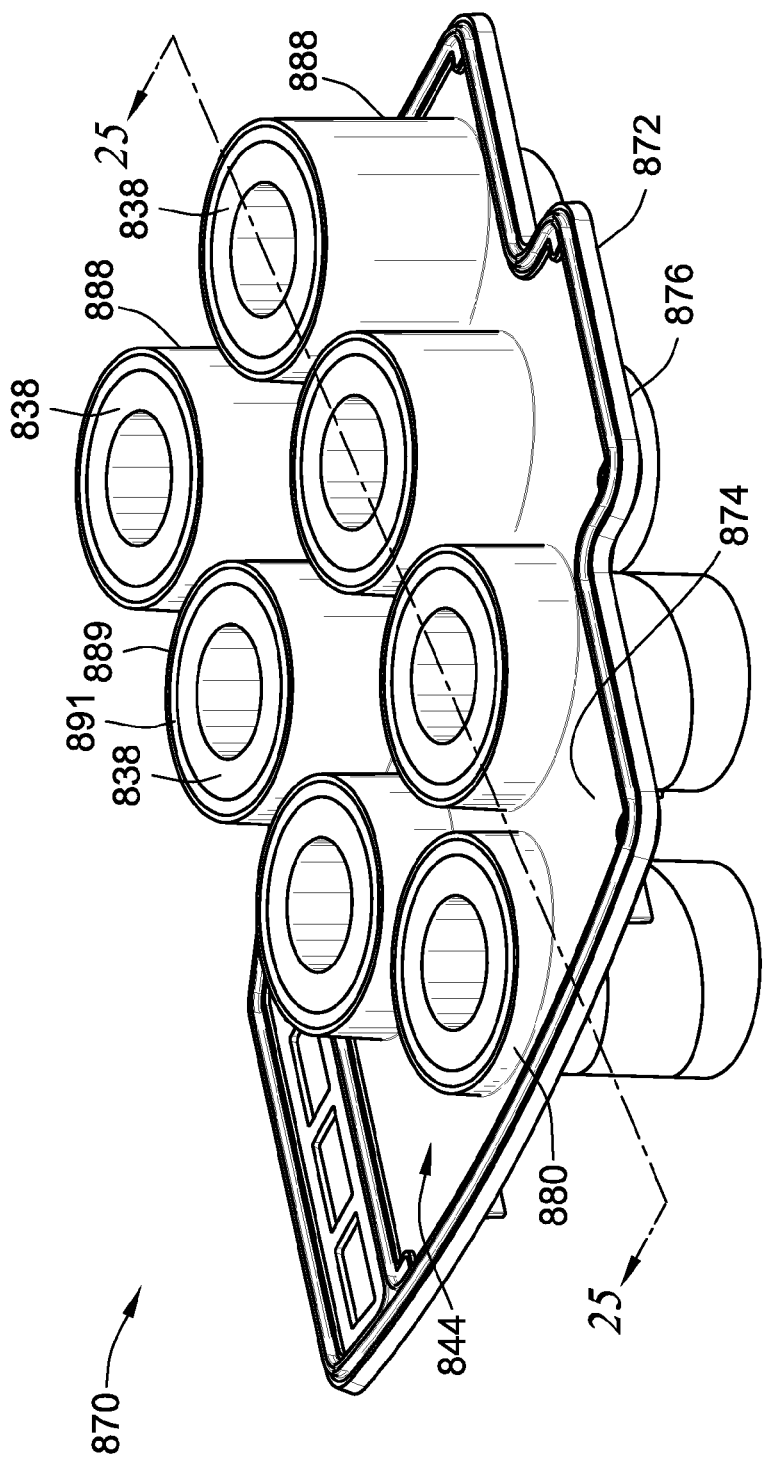
FIG. 23 is an isometric view of an unfiltered side of a coalescing filter element in accordance with another embodiment of the invention.
Figure 24:
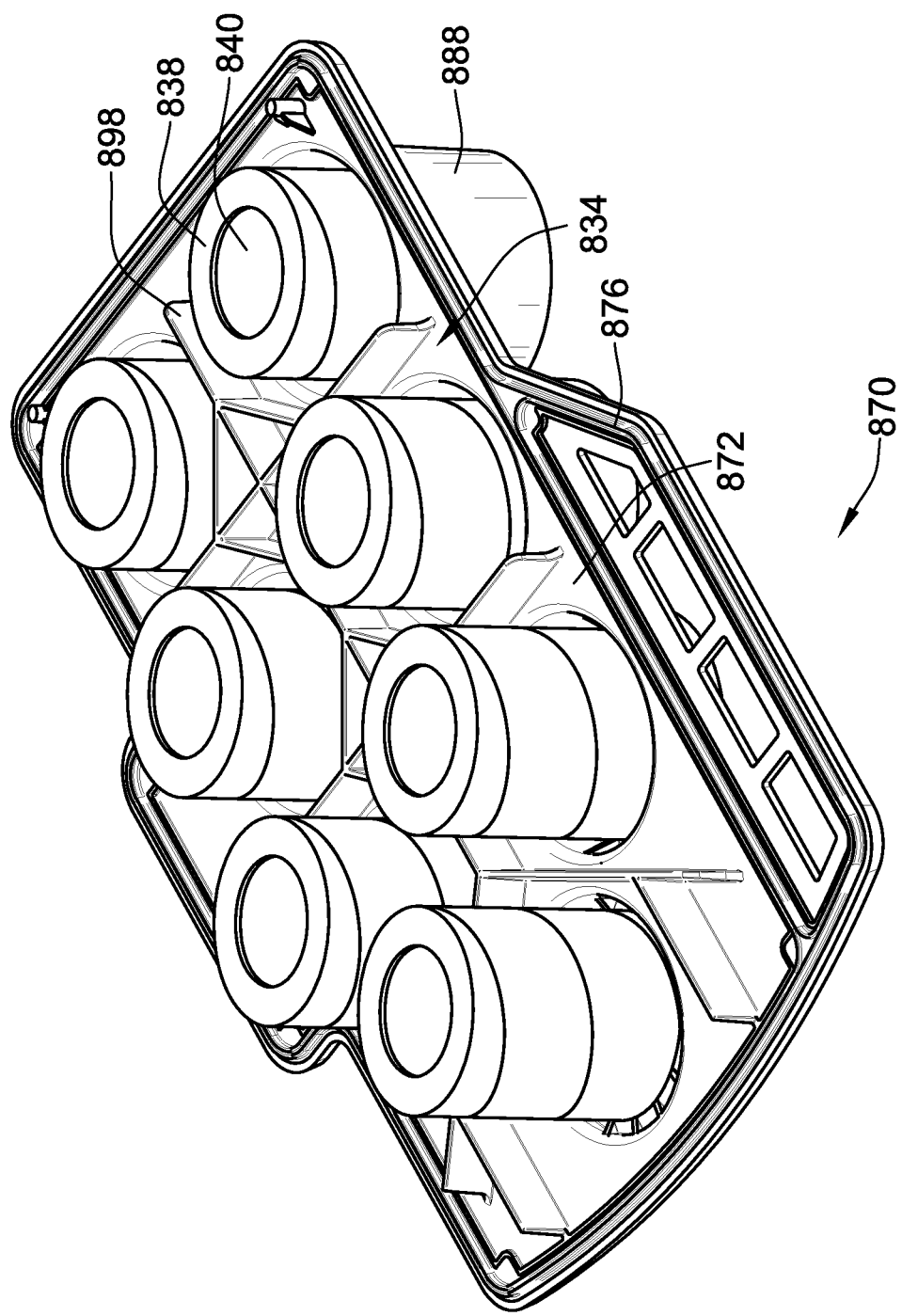
FIG. 24 is an isometric view of a filtered side of the coalescing filter element of FIG. 23.

FIG. 23 illustrates the unfiltered side 844 while FIG. 24 illustrates the filtered side 834. In the illustrate configuration, the filter element 870 includes tube segments of coalescing filter media 838 disposed within tubular filter media receptacles 888 formed in the panel member 874 of the frame 872.

The tube segments of coalescing filter media 838 are sealed at one end to axial ends 889 of the receptacles 888 on unfiltered side 844 by collars 891. Collars 891 are positioned radially between a radially outer periphery of the media 838 and inner radial periphery of the tubular filter media receptacles 888. In one embodiment, the collars 891 are provided by urethane adhesive. Other means of sealing the filter media 838 to the receptacles 888 could be provided as well. The ends of the tube segments of coalescing filter media 838 adjacent the axial ends 889 of the tube of filter media 838 may be recessed inward of the axial ends 889 of the receptacles 888.

Figure 25:
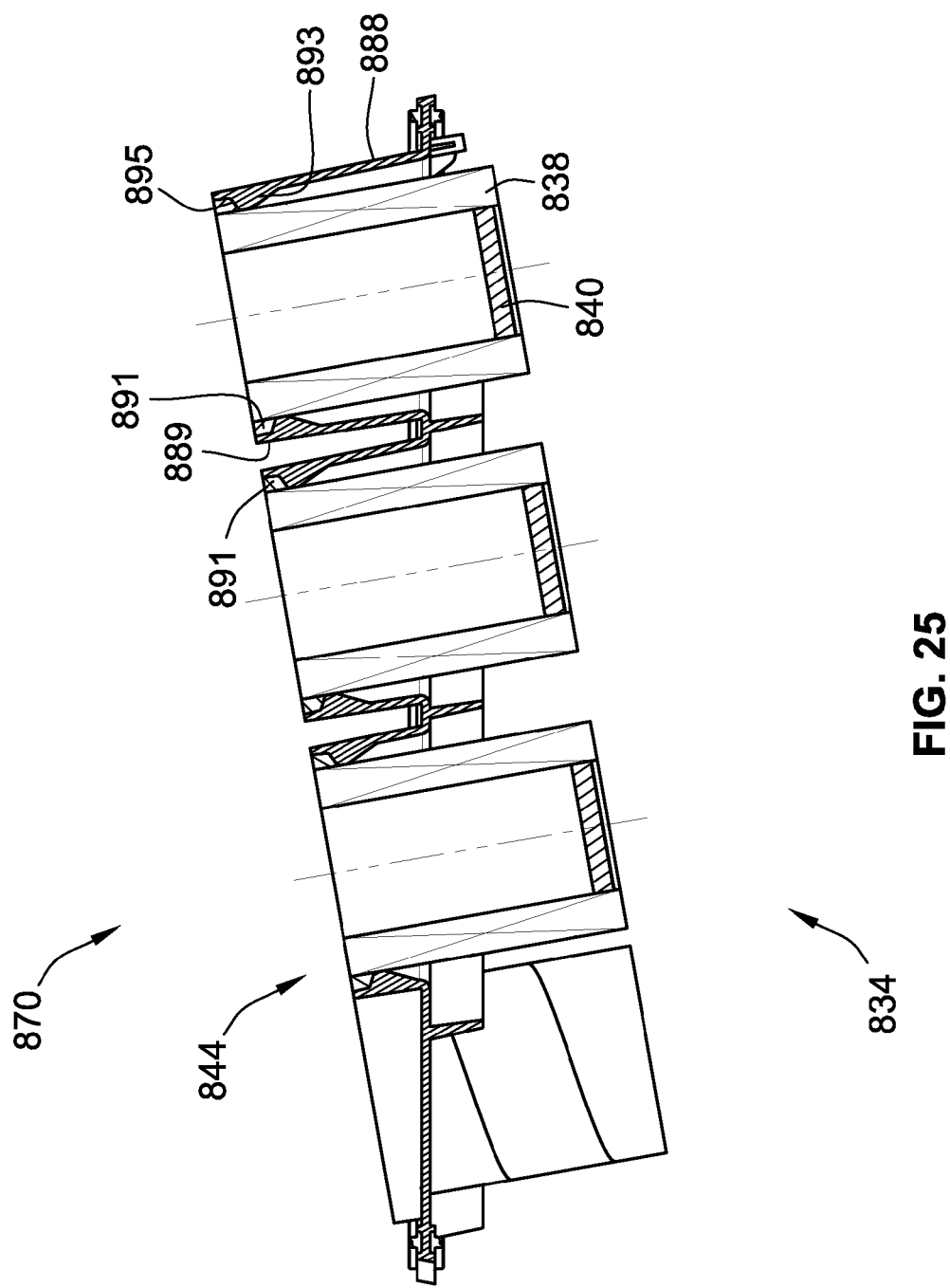
FIG. 25 is a cross-sectional view of the coalescing filter element of FIG. 23.
Figure 26:
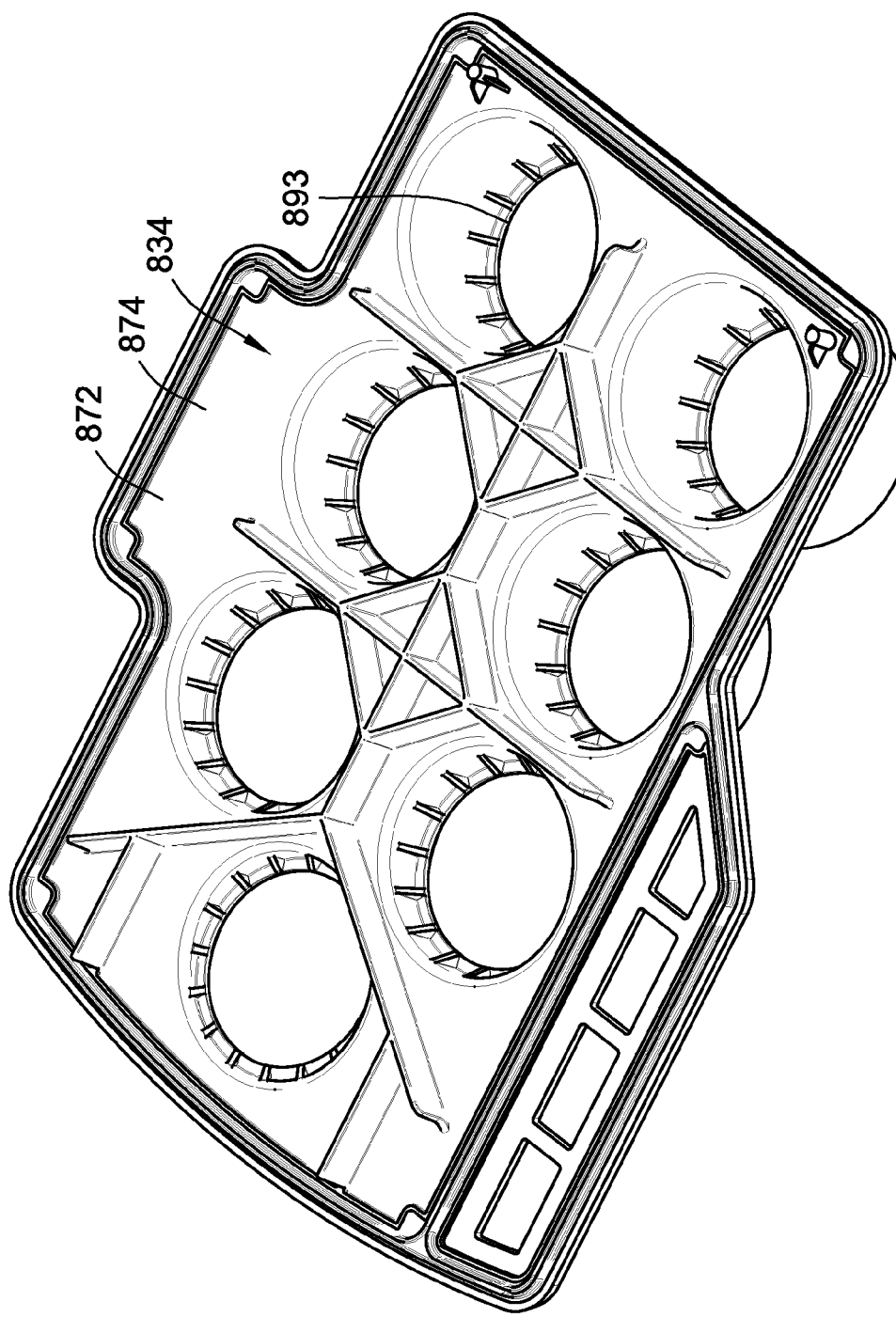
FIGS. 26-28 illustrate the frame of the filter element of FIG. 23.
Figure 27:
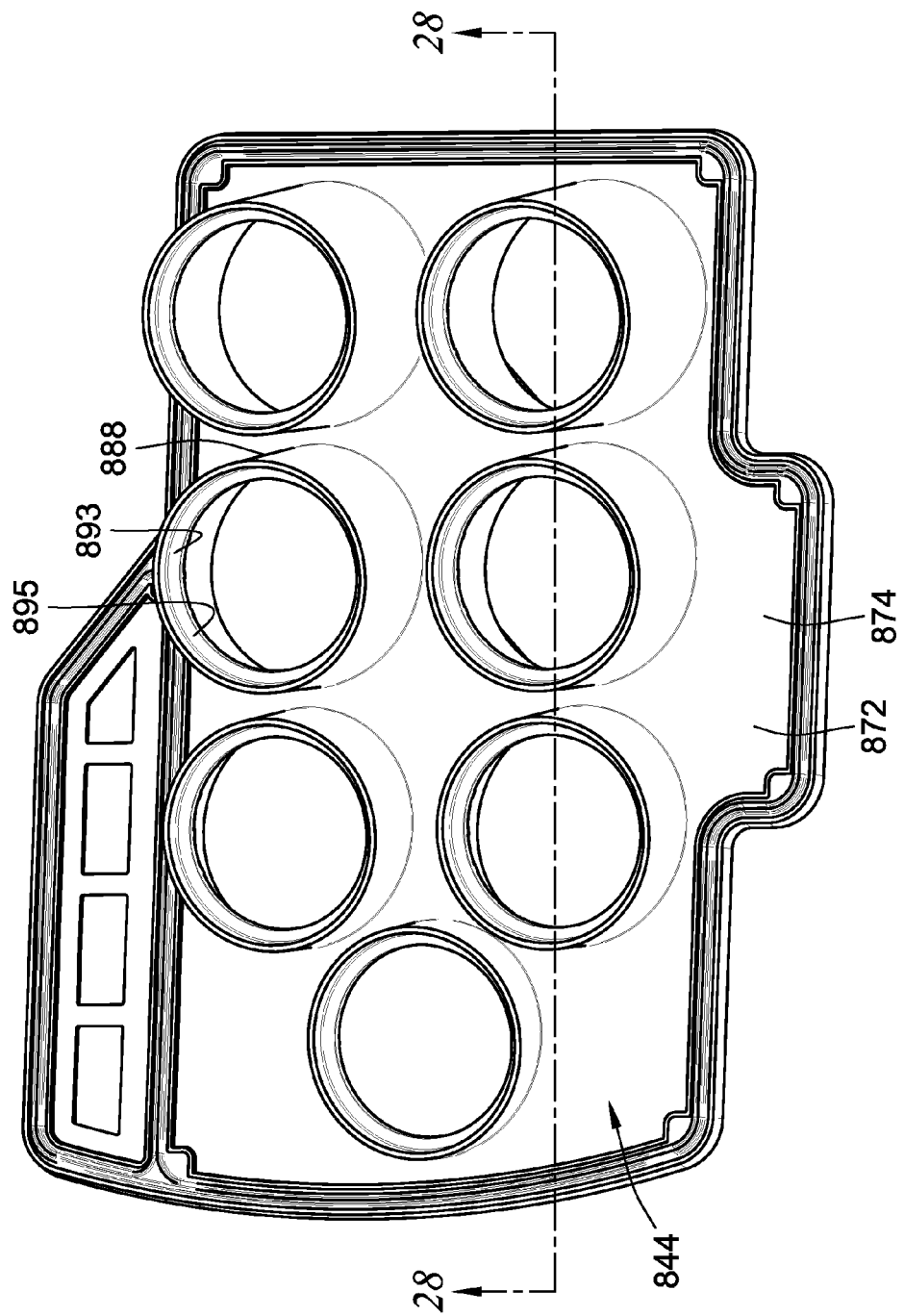
Figure 28:
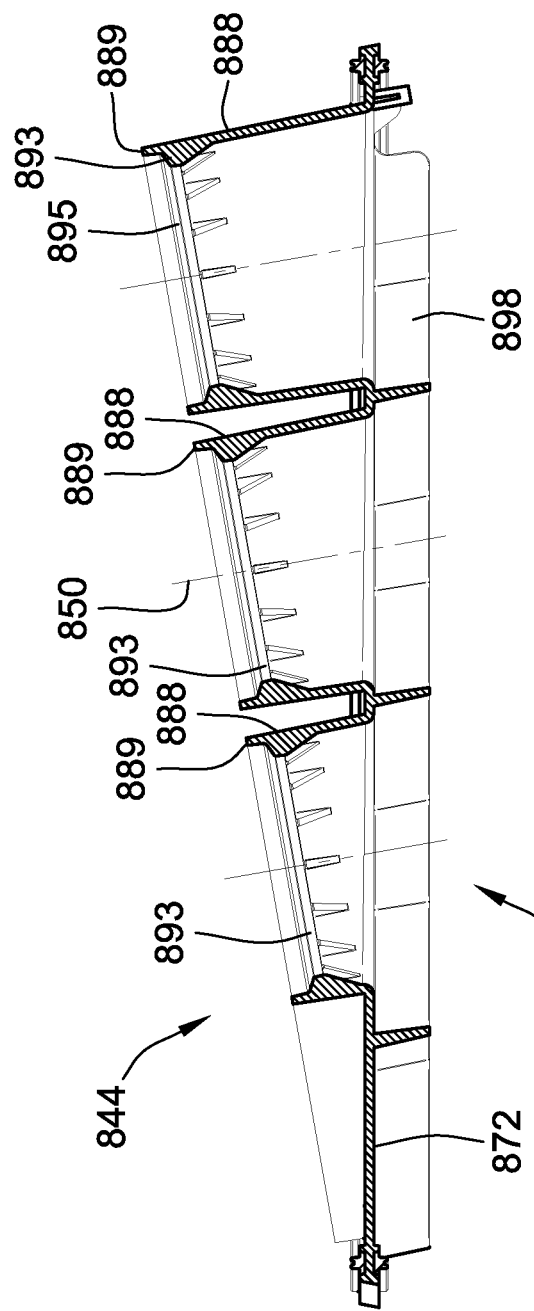

With reference to FIGS. 25 and 28, the inner surface of the receptacles 888 may include a collar support flange 893 that extends radially inward and provides an axially outward facing support face 895 that axially supports collar 891. The collar support flange 893 and particularly support face 895 may be angled relative to a central axis 850 of the receptacles 888.

With reference to FIG. 24, the opposite ends of the tube segments of coalescing filter media 838 can be closed by plug 840 secured within the central region of the filter media 838.

The filtered side 834 of the filter element 870 and particularly frame 872, includes a rib network 898 comprising interconnected flange like structures extending outward from panel member 874 and interspersed between the segments of filter media 838. The rib network 898 provides additional structural support to frame 872.

Figure 29:
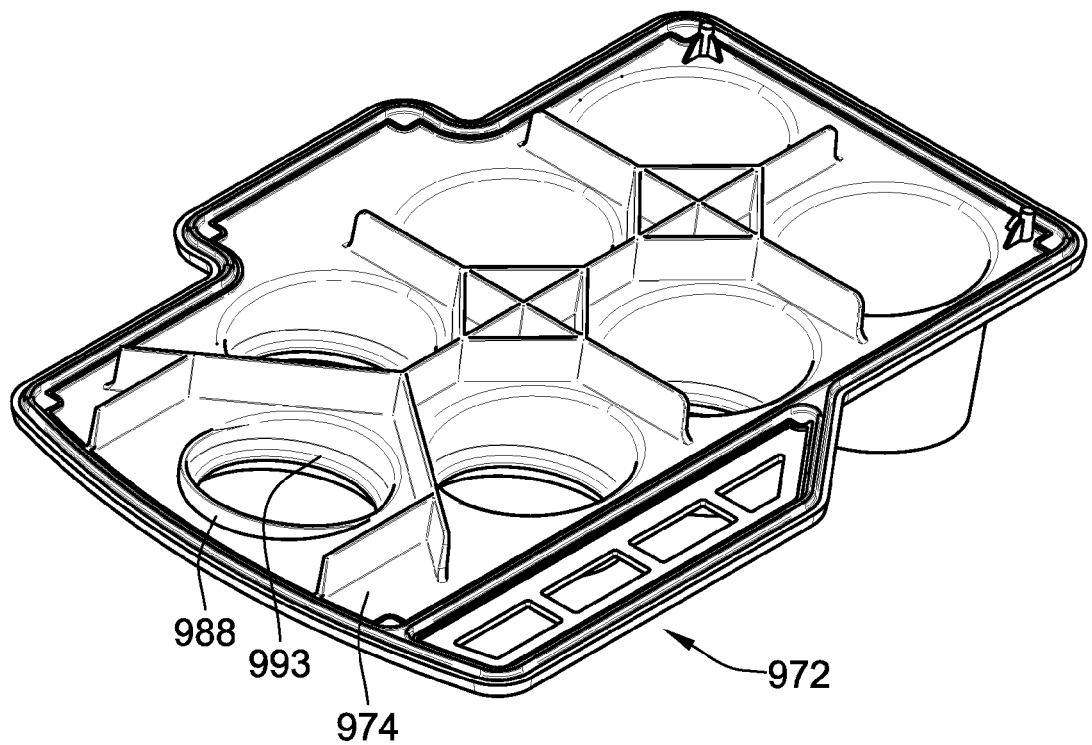
FIGS. 29 and 30 illustrate a further frame similar to that of the filter element of FIGS. 23-28.
Figure 30:
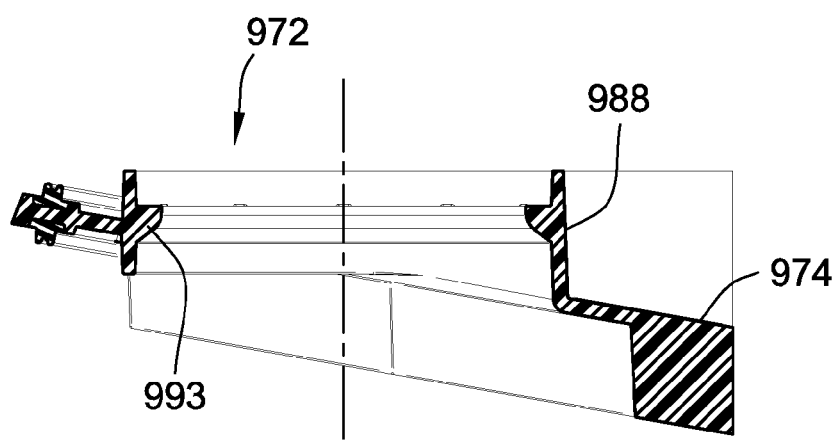

FIGS. 29 and 30 illustrate a further embodiment of a frame 972. The frame 972 includes a collar support flange 993 similar to the prior frame 872. However, the collar support flange 993 tapers in the opposite direction as collar support flange 893. In this embodiment, the filter media receptacle 988, at one location, extends at partially entirely through the panel member 974.

Figure 31:
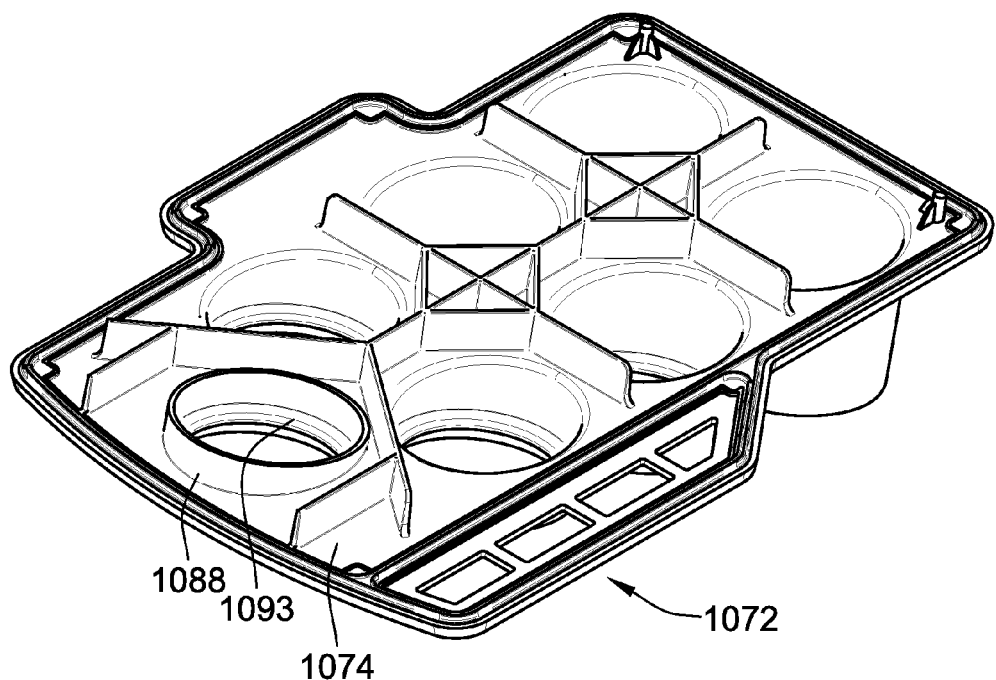
FIGS. 31 and 32 illustrate a further frame similar to that of the filter element of FIGS. 23-28.
Figure 32:
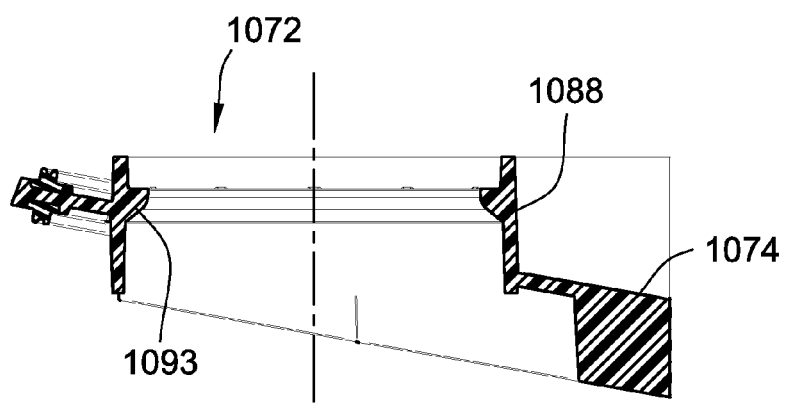

FIGS. 31 and 32 illustrate a further embodiment of a frame 1072. The frame 1072 includes a filter media receptacle 1088, in at least one location, that extends entirely through the panel member 1074.

Figure 33:
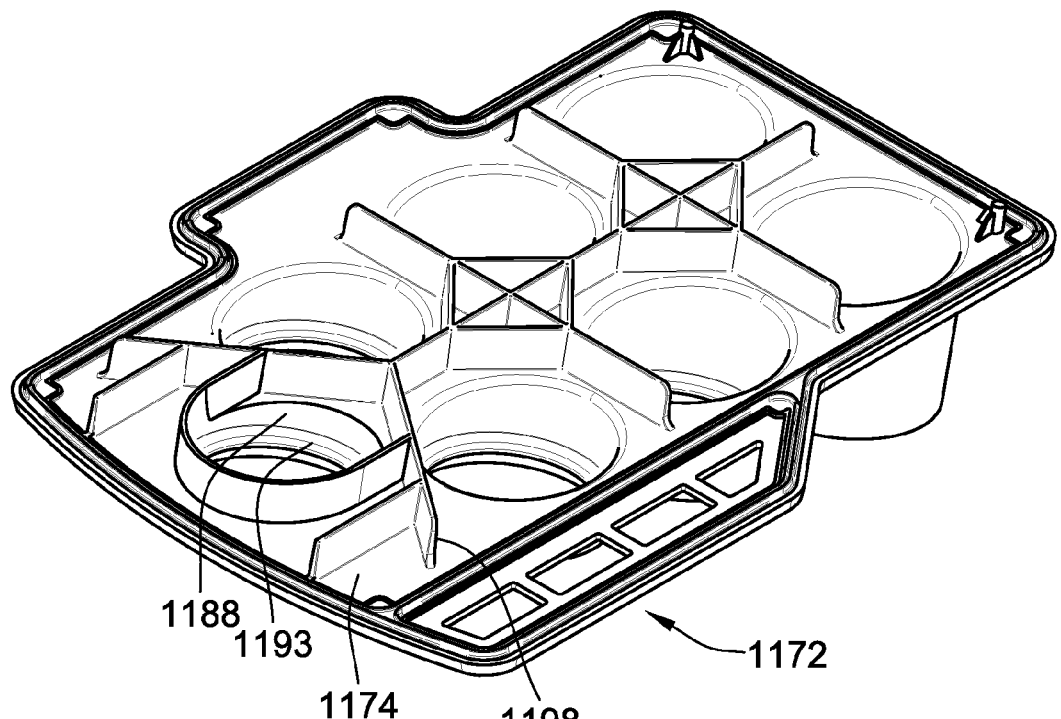
FIGS. 33 and 34 illustrate a further frame similar to that of the filter element of FIGS. 23-28.
Figure 34:
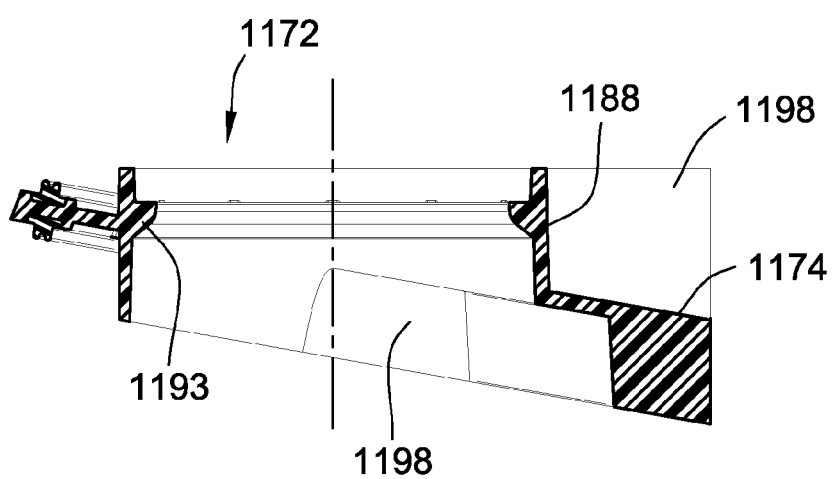

FIGS. 33 and 34 illustrate a further embodiment of a frame 1172. In this embodiment, the filter media receptacle 1188 merges and transitions into the rib network 1198 on one side of panel member 1174.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A coalescing filter assembly, comprising:
a housing comprising a base housing member and a cover housing member joined together to form a coalescing chamber, the base housing member comprising a base end panel and a base border wall projecting from the end panel, the cover housing member comprising a cover end panel and a cover border wall projecting from the cover end panel, the cover end panel and the base end panel being spaced apart laterally with the coalescing chamber therebetween, the cover border wall and the base border wall joining along a seal interface to surround the coalescing chamber, the cover end panel and the base end panel extending at an angle relative to the seal interface of at least five degrees in the vertical direction; and a coalescing filter element comprising a frame having a partition separating an unfiltered side from a filtered side, the partition having a coalescing inlet port connecting the unfiltered side and the filtered side and carrying a coalescing filter media arranged to filter fluid flowing through the coalescing inlet port;
wherein the partition includes a panel member, the panel member carrying a seal member at an outer periphery thereof that seals along the seal interface whereby the partition is free of a diagonal tapering border skirt;
wherein the coalescing filter element includes a coalescing tube providing said coalescing filter media, the coalescing tube being generally cylindrical;
a plug projecting into an open end of the coalescing tube; and
wherein the plug has a portion that at most partially covers a flat end face of the coalescing tube, wherein the flat end face is at least partially exposed so that fluid can pass through the end face of the coalescing tube.

2. The coalescing filter assembly of claim 1, wherein the plug includes a flared outer rim that transitions a diameter of the plug from a first diameter to a second diameter, where the second diameter is larger than the first diameter such that the flared outer rim of the plug is in contact with a hollow cylindrical cavity of the coalescing tube.

3. A coalescing filter assembly, comprising:
a housing comprising a base housing member and a cover housing member joined together to form a coalescing chamber, the base housing member comprising a base end panel and a base border wall projecting from the end panel, the cover housing member comprising a cover end panel and a cover border wall projecting from the cover end panel, the cover end panel and the base end panel being spaced apart laterally with the coalescing chamber therebetween, the cover border wall and the base border wall joining along a seal interface to surround the coalescing chamber, the cover end panel and the base end panel extending at an angle relative to the seal interface of at least five degrees in the vertical direction; and
a coalescing filter element comprising a frame having a partition separating an unfiltered side from a filtered side, the partition having a coalescing inlet port connecting the unfiltered side and the filtered side and carrying a coalescing filter media arranged to filter fluid flowing through the coalescing inlet port;
wherein the partition includes a panel member, the panel member carrying a seal member at an outer periphery thereof that seals along the seal interface whereby the partition is free of a diagonal tapering border skirt;
wherein the coalescing filter element includes a coalescing tube providing said coalescing filter media, the coalescing tube being generally cylindrical;
further comprising a plurality of the coalescing tube segments to provide of the coalescing tube, each coalescing tube segments secured separately to the frame; and
each coalescing tube segment attached to the secured to the frame such that each coalescing tube segment has a flat end face, wherein the flat end face is at least partially exposed so that fluid can pass through the end face of the coalescing tube.

4. The coalescing filter assembly of claim 3, wherein the frame includes tubular receptacles projecting from the panel member, the tubular receptacles contacting an outer cylindrical surface of one of the coalescing tube segments and defining flare regions in which adhesive bonds the coalescing tube segments to the tubular receptacles.

5. The coalescing filter assembly of claim 3, further comprising a rib network interconnecting adjacent tubular receptacles.

6. The coalescing filter assembly of claim 1, further comprising a tapering channel recessed into the panel joined to an end wall through which the coalescing inlet port is disposed, the coalescing tube in fluid communication with the coalescing inlet port through the end wall with the tapering channel receiving the coalescing tube.

7. The coalescing filter assembly of claim 6, wherein the panel member is parallel to a filter axis and the tapering channel extends along a filter media axis, the filter media axis is angularly offset from the filter axis between five degrees and thirty degrees.

8. A coalescing filter assembly, comprising:
a housing comprising a base housing member and a cover housing member joined together to form a coalescing chamber, the base housing member comprising a base end panel and a base border wall projecting from the end panel, the cover housing member comprising a cover end panel and a cover border wall projecting from the cover end panel, the cover end panel and the base end panel being spaced apart laterally with the coalescing chamber therebetween, the cover border wall and the base border wall joining along a seal interface to surround the coalescing chamber, the cover end panel and the base end panel extending at an angle relative to the seal interface of at least five degrees in the vertical direction; and
a coalescing filter element comprising a frame having a partition separating an unfiltered side from a filtered side, the partition having a coalescing inlet port connecting the unfiltered side and the filtered side and carrying a coalescing filter media arranged to filter fluid flowing through the coalescing inlet port;
wherein the partition includes a panel member, the panel member carrying a seal member at an outer periphery thereof that seals along the seal interface whereby the partition is free of a diagonal tapering border skirt; and
wherein the partition includes an at least one coalescing filter media receptacle formed through the partition, the coalescing inlet port defined by the at least one coalescing filter media receptacle, the coalescing filter media being disposed within at least one coalescing filter media receptacle; and
the filter media receptacle having a portion defining the coalescing inlet port, the portion defining the coalescing inlet port having an inner diameter, the inner diameter being equal to an outer diameter of the coalescing filter media with at least a portion of the coalescing filter media extending axially into the portion of the filter media receptacle defining the coalescing inlet port.

9. The coalescing filter element of claim 8, wherein the at least one coalescing filter media receptacle includes an axial end that is disposed on the filtered side and defines a receptacle axis.

10. A coalescing filter element, comprising:
a frame having a partition separating an unfiltered side from a filtered side, the partition having a coalescing inlet port connecting the unfiltered side and the filtered side;
at least one coalescing tube comprising coalescing filter media arranged to filter fluid flowing through the coalescing inlet port;
wherein the partition includes a panel member, the panel member carrying a seal member at an outer periphery thereof, a tapering channel formed and recessed into the panel member, the tapering channel joined to an end wall that projects outward from the panel member, the coalescing inlet port formed through the end wall, at least one coalescing tube being in fluid communication with the coalescing inlet port through the end wall with the tapering channel receiving the coalescing tube;

wherein at least one coalescing tube is cylindrical having a cylindrical outer periphery and a cylindrical inner periphery, the cylindrical inner periphery defines a hollow cylindrical cavity; and further comprising an open ended end member disposed between the coalescing inlet port and the at least one coalescing tube, the end member is heat staked to the coalescing tube.

11. The coalescing filter element of claim 10, further comprising an o-ring disposed between the end member and the coalescing inlet port, the o-ring creates an airtight seal between the end member and the coalescing inlet port such that all of the fluid that enters the coalescing inlet port is passed through the open ended end member into the coalescing filter media.

12. The coalescing filter element of claim 10, wherein the coalescing inlet port includes a plurality of flexible fingers that extend axially from the coalescing inlet port, the plurality of flexible fingers each include a sloped surface that terminate in a stepped mating surface that mates with an axial end of the open ended end member.

13. The coalescing filter element of claim 10, further comprising a plug disposed in an end of the at least one coalescing tube located opposite from the open ended end member.

14. The coalescing filter element of claim 13, wherein the plug includes a flared outer rim that transitions a diameter of the plug from a first diameter to a second diameter, where the second diameter is larger than the first diameter such that the flared outer rim of the plug creates a seal with the hollow cylindrical cavity of the at least one coalescing tube.

15. The coalescing filter element of claim 14, further comprising a bracket disposed proximate to the plug, the bracket is slideably attached to the partition and proximate the plug on the filtered side of the frame, the bracket is in abutting relation to the plug such that the plug maintains its axial position within the hollow cylindrical cavity of the at least one coalescing tube; and wherein the plug includes a cavity and the bracket includes a protrusion, the protrusion is inserted into the cavity.

16. A coalescing filter assembly, comprising:

a housing comprising a base housing member and a cover housing member joined together to form a coalescing chamber, the base housing member comprising a base end panel and a base border wall projecting from the base end panel, the cover housing member comprising a cover end panel and a cover border wall projecting from the cover end panel, the cover end panel and base end panel being spaced apart laterally with the coalescing chamber therebetween, the cover border wall and the base border wall joining along a seal interface, wherein the base housing member comprises an inlet and an outlet with a fluid flow path running from the inlet to the outlet through the coalescing media of the coalescing filter element, the base housing member further including a drain arranged at a gravitational bottom of the housing;

a coalescing filter element mounted in the coalescing chamber, the coalescing filter element comprising a frame having a partition separating an unfiltered side from a filtered side, a coalescing inlet port formed through the partition; and a coalescing tube comprising coalescing filter media and a central cavity extending between opposed end faces, a central flow axis extending into the coalescing tube through the coalescing inlet port and the central cavity with the coalescing filter media surrounding the central flow axis, the central flow axis extending substantially vertical with no more than thirty degrees variance from vertical such that one of the opposed end faces is adjacent the drain;

a seal member sealing the frame in surrounding relation of the partition to the housing, the seal sealing along the seal interface; and further comprising an open ended end member disposed between the coalescing inlet port and the coalescing filter media, the open ended end member is heat staked to the coalescing filter media.

17. The coalescing filter assembly of claim 16, further comprising an o-ring disposed between the open ended end member and the coalescing inlet port and configured to form an airtight seal therebetween.

18. The coalescing filter assembly of claim 16, further comprising a plug disposed in an end face of the coalescing tube proximate the drain of the base housing member.

19. A coalescing filter element, comprising:

a frame having a partition separating an unfiltered side from a filtered side, the partition having a coalescing inlet port connecting the unfiltered side and the filtered side and carrying a tubular coalescing filter media arranged to filter fluid flowing through the coalescing inlet port;

wherein the partition includes a panel member;

wherein the tubular coalescing filter media comprises opposed end faces, with a tubular ring extending therebetween to provide a coalescing tube, at least one of the opposed end faces being at least partially exposed to allow fluid flow through at least one of the opposed end faces; and further comprising a plug projecting into an open end of the coalescing tube.

20. The coalescing filter assembly of claim 19, wherein the plug has a portion that partially covers a flat end face of the coalescing tube and a projecting portion extending axially into the coalescing tube.

21. The coalescing filter assembly of claim 19, wherein the plug includes a flared outer rim that transitions a diameter of the plug from a first diameter to a second diameter, where the second diameter is larger than the first diameter such that the flared outer rim of the plug is in contact with a hollow cylindrical cavity of the coalescing tube.

22. A coalescing filter element, comprising:

a frame having a partition separating an unfiltered side from a filtered side, the partition having a coalescing inlet port connecting the unfiltered side and the filtered side and carrying a tubular coalescing filter media arranged to filter fluid flowing through the coalescing inlet port;

wherein the partition includes a panel member;

wherein the tubular coalescing filter media comprises opposed end faces, with a tubular ring extending therebetween to provide a coalescing tube, at least one of the opposed end faces being at least partially exposed to allow fluid flow through at least one of the opposed end faces; and further comprising a plurality of the coalescing tube segments to provide of the coalescing tube, each coalescing tube segments secured separately to the frame.

23. The coalescing filter element of claim 9, wherein the receptacle axis is angularly offset from the filter axis between five degrees and thirty degrees.

24. The coalescing filter element of claim 23, wherein the coalescing filter media is tubular coalescing filter media and is axially aligned with a coalescing filter media axis, the coalescing filter media axis is perpendicular to the receptacle axis and angularly offset from the filter axis.

25. The coalescing filter assembly of claim 3, wherein the coalescing tube segments each surround a tube segment filter axis, the tube center filter axis being disposed at an angle of between 95 degrees and 120 degrees to a plane of the panel member.

26. The coalescing filter assembly of claim 22, wherein the frame includes tubular receptacles projecting from the panel member, the tubular receptacles contacting an outer cylindrical surface of one of the coalescing tube segments and defining flare regions in which adhesive bonds the coalescing tube segments to the tubular receptacles.

27. The coalescing filter assembly of claim 22, further comprising a rib network interconnecting adjacent tubular receptacles.

\* \* \* \* \*